(12) United States Patent
Dresden

(10) Patent No.: US 9,785,950 B2
(45) Date of Patent: Oct. 10, 2017

(54) DYNAMIC TRACKING, ANALYSIS AND ACQUISITION OF E-COMMERCE ADVERTISING CHANNELS FOR TOLL-FREE MARKETS

(76) Inventor: Scott Dresden, Delray Beach, FL (US)

( * ) Notice: Subject to any disclaimer, the term of this patent is extended or adjusted under 35 U.S.C. 154(b) by 2686 days.

(21) Appl. No.: 10/710,852

(22) Filed: Aug. 7, 2004

(65) Prior Publication Data
US 2005/0004846 A1    Jan. 6, 2005

Related U.S. Application Data

(63) Continuation of application No. 10/407,323, filed on Apr. 4, 2003, now abandoned.

(60) Provisional application No. 60/457,794, filed on Mar. 26, 2003.

(51) Int. Cl.
*G06Q 30/02* (2012.01)
*G06Q 30/06* (2012.01)
*G06Q 30/08* (2012.01)

(52) U.S. Cl.
CPC ......... *G06Q 30/02* (2013.01); *G06Q 30/0256* (2013.01); *G06Q 30/0601* (2013.01); *G06Q 30/08* (2013.01)

(58) Field of Classification Search
USPC .................. 379/114.13, 88.2; 705/14, 37, 26
See application file for complete search history.

(56) References Cited

U.S. PATENT DOCUMENTS

| | | | | |
|---|---|---|---|---|
| 5,937,390 A | * | 8/1999 | Hyodo | 705/14 |
| 6,097,792 A | * | 8/2000 | Thornton | 379/88.2 |
| 6,470,079 B1 | * | 10/2002 | Benson | 379/114.13 |
| 6,898,571 B1 | * | 5/2005 | Val et al. | 705/14.39 |
| 7,120,235 B2 | * | 10/2006 | Altberg et al. | 379/114.13 |
| 7,200,566 B1 | * | 4/2007 | Moore et al. | 705/26 |
| 2003/0220866 A1 | * | 11/2003 | Pisaris-Henderson et al. | 705/37 |

* cited by examiner

*Primary Examiner* — Afaf Osman Bilal Ahmed
(74) *Attorney, Agent, or Firm* — Laurence A. Greenberg; Werner H. Stemer; Ralph E. Locher

(57) ABSTRACT

The present invention assists the critical real-time decision making required to make important decision on bidding on various customer procurement commodities in a telephonic sales market. The invention provides dynamic pricing as a function of Internet or other types of advertisement costs for the telephonic market. In a preferred embodiment, the present invention is a virtual or physical e-commerce application with an interface connected to the telephonic routing system. A tracking identifier is used with an advertisement, usually a web-based ad, and routed via the vendor to the analysis and procurement system to measure advertising channel effectiveness. A pool of bidders can analyze the tracking data for effective and bid and procure an automated or manual 1800 sales call from a consumer based on a number of factors.

6 Claims, 21 Drawing Sheets

| KEYWORD | SITE | TIME PERIOD | COST/CT. | BID RES. PERFORMANCE REL. | TP WEIGHT |
|---|---|---|---|---|---|
| "SKIN CARE" | 50(1) | SUN 1-4P | 0.27 | X | |
| | 50(2) | ALL DAY | 0.15 | | |
| | 50(2) | 1-6P | 0.24 | | |
| | 50(3) | ALL DAY | 0.17 | | |
| | 50(3) | WEEK | 0.125 | | |

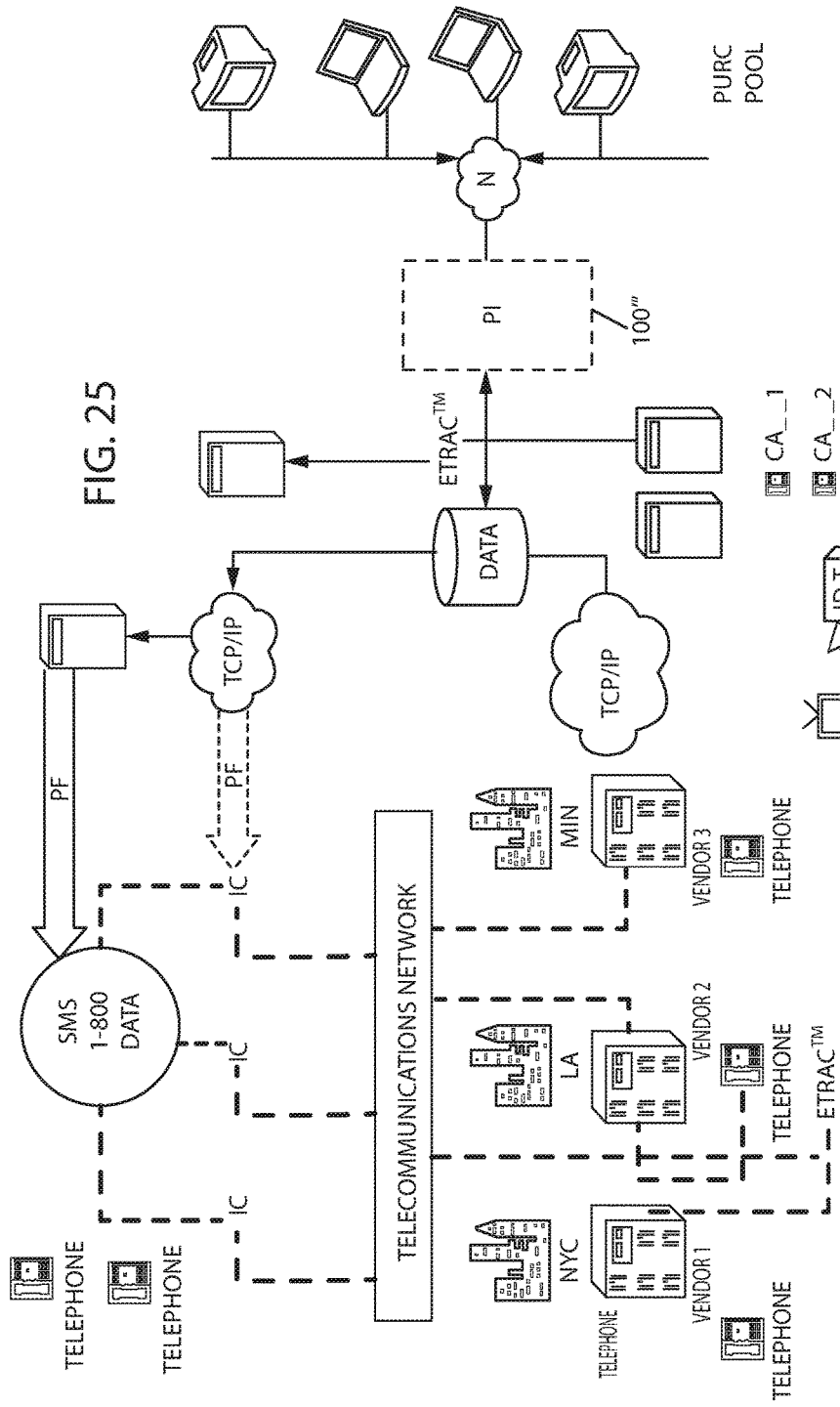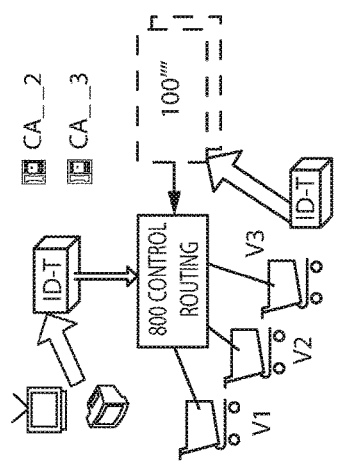

DYNAMIC TRACKING, ANALYSIS AND ACQUISITION OF E-COMMERCE ADVERTISING CHANNELS FOR TOLL-FREE MARKETS

REFERENCE TO PRIORITY APPLICATIONS

This Application is a continuation-in-part of and claims priority under 35 USC §120 to co-pending U.S. application Ser. No. 10/407,323 entitled Integrated dynamic pricing and procurement support for e-commerce advertising channels, filed Apr. 4, 2003, which claims priority under 35 USC §119(e) to U.S. Provisional Application No. 60/457,794, entitled Dynamic margin and pricing decision support tool for customer procurement transactions, filed Mar. 26, 2003, both of which are incorporated by reference for all purposes.

BACKGROUND ART

A small segment of market share for an e-commerce site/company may mean the difference between a company going broke and being profitable. One of the particular problems with the standard e-commerce transactions now that many consumers have high-speed access to the Internet allowing the consumer to access to an enormous amount of pricing and product information over a short period of time that would not have previously been available even with dial-up speeds.

Processing times for Internet graphics and data allow consumers to have multiple (if not dozens) of screens open at the same time for comparison shopping. The consumer of such information is based on a much broader concept than a purchaser buying a product or service. Thus, drawing the customer in to begin with is vital. One of most natural ways to get a consumer to the passive side is to capture them while they are not sure where to look on the Internet for something.

Many e-commerce sites use novel transaction techniques to draw customers in to their sites. Quite a variety of Internet and e-commerce techniques have been developed over the last decade. Many of them include novel ways to sell, buy, trade, barter, negotiate, manage, advertise and promote over the Internet or other wide area network (WAN). Some example Internet e-commerce sites that provide for nontraditional transactions includes Ebay® (timed auctions, immediate purchase), Priceline.com® (reverse auction, aggregate conditional purchase offers U.S. Pat. No. 6,466,919), elimination of a secondary trade channel (U.S. Pat. No. 6,434,536), and managing the valuation and sale of an aging product inventory (U.S. Pat. No. 6,119,100) assigned to Walker Digital.

*Digital Dealing* by economist Robert E. Hall (W. W. Norton, 2001) is a good review of the current state of electronic transactions in the business-to-consumer and business-to-business electronic environment. In particular, Dr. Hall discusses the various Internet auction systems, which are depicted in a simplified form in FIGS. 1 and 2. This book is hereby incorporated by reference to show the types of transactions and their transactional operation for products and services being made over the Internet.

The increasing need for finding relevant data over the Internet has produced a number of categories of data searching techniques and technology over wide area networks and in particular the Internet. Many of these techniques are included in patents and publications provided by well-known industry leaders in the Internet searching business including Google™ and Overture™.

Searching techniques may provide searching based on input terms. The information returned to the user may still be inadequate for guidance because of the layers of information under an entrance page. For example, a large institution such as a government, corporation, or nonprofit organization may easily have more than 100,000 pages or documents on one single top-level domain uniform resource locator (URL) and at least a few thousand under a single sublevel. One very popular method for keyword searching is the "scoring" method. Google, Inc. of Mountain View, Calif. has several published U.S. Patent Applications including 2001/0123988 entitled "Methods and Apparatus for Employing Usage Statistics in Document Retrieval" by Dean et al. and 2001/0133481 entitled "Methods and Apparatus for Providing Search Results in Response to an Ambiguous Search Query." Google™ owns other technology related to data searching techniques, for example, a recently issued U.S. Pat. No. 6,526,440 entitled "Ranking Search Results by Reranking the Results Based on Local Interconnectivity" by Krishna Bharat, which teaches the use of connectivity to determine "relevance." These publications are incorporated by reference as they show the use of keywords in returning search results. As can be appreciated, one of the drawbacks of the "scoring" method is that like any statistical method, it can be artificially "skewed" by either a disproportionate group of users or other manipulable techniques. Mechanisms can be put into place to account for these factors, the technological advances, and otherwise "skewable" techniques. For example, U.S. Pat. No. 6,269,361 issued to Davis, et al. and assigned to GoTo.com of Pasadena, Calif., describes such a technique for influencing a place in the list of a search engine. As needed to detail the problem of influencing search results, this document is hereby incorporated by reference.

Promotional literature relating to advertising on search engines and maximizing its effect are: Successful Keyword Searching: Initiating Research on Popular Topics Using Electronic Databases by Randall M. MacDonald and Susan Priest MacDonald; 101 Ways to Boost Your Web Traffic: Internet Promotion Made Easier, 2nd edition by Thomas Wong; and Streetwise Maximize Web Site Traffic: Build Web Site Traffic Fast and Free by Optimizing Search Engine Placement by Robin Nobles and Susan O'Neil. These publications are hereby incorporated by reference to illustrate the operations of search engine marketing techniques. Measuring performance of advertising on the Internet has two problems. The first problem is that the Internet measurement industry is simply getting used to the appropriate and relevant criteria to measure. Companies such as Nielsen, Gartner Group, and Arbitron have been measuring the "effectiveness" of exposures in traditional media such as radio and television, but applying traditional criteria to Internet advertising has not been effective. Thus, the more easily measured "number of views" is a particular criterion to which sellers of advertising space can point as a pricing system for selling advertising space. Companies such as Media Metrix® have patents such as U.S. Pat. No. 6,115,680 (which is hereby incorporated by reference) currently issued to them for placing and measuring advertising on typical Internet site visit. Other companies such as DoubleClick® use similar techniques.

The second problem in determining the cost-effectiveness of marketing tools placed over the Internet is interactivity and invasive recording. Simply put, a user of the Internet may view an "impression" on a site. To some degree the placement of "cookies" on a user's computer can help measure the Internet metrics, although tracking consumer behavior after leaving a site is difficult unless the consumer is consenting to invasive recording. Another way is "tracking," which has infuriated many consumers who resent that they are being spied on constantly.

The partial solution is to measure or charge by the "click-through." The consumer responds to an advertisement by clicking on a specific link, which redirects their browser or opens a new window to another uniform resource locator (URL). While the tracking is lost, charging by this behavior as opposed to what the consumer sees may provide a better assessment of advertising value. A particularly effective use of advertising space is based on search engine criteria, also known in one aspect as keywords. Keywords are generally natural language search "terms" entered into a search engine site query by a user. The reason that keyword advertising may be a better advertising mechanism is that the user chooses the type of ads that will be presented as opposed to the pop-up advertisements that have been compared to junk mail and junk email (spam). Thus, the Internet advertisement system of click-through for keywords is a much more cost related solution.

There are a variety of accounting and data management tools that are implemented currently which can gather data over the Internet or network for an individual or business or consumer transactions. Many of these tools are implemented by the sellers of the Internet advertisements themselves who have a self-interest in analyzing the data in their favor.

Often, to lure customers and gain market share, e-commerce companies have sold items at a loss to gain brand or site recognition. The pricing of items sold over the Internet may have very little to do with actual cost or the desired margin of each item. Furthermore, the cost of customer procurement may seriously vary the profit or loss from each item sold and the price of any customer procurement. It has also been suggested by Martin Bichler in *The Future of e-Markets*, Chapter 3 (Cambridge, 2001) chapter 3, that the Internet pricing models have become not only varied but dynamic, the text of which is hereby incorporated by reference. Thus, dynamic pricing makes the relationship between customer procurement over the Internet, performance and profit margin all the more difficult to determine.

DISCLOSURE OF INVENTION

Because of the above-discussed problems in determining the value of Internet advertisement and its relation to customer procurement and product profitability, it is desirable for e-commerce sellers to have some type of mechanism to assist them in setting and executing goals for profit and loss both at a product and a global level and with the speed to make time-critical value decisions about customer procurement purchases and product pricing. The present invention assists the critical real-time decision making required to make important decision on bidding on various customer procurement commodities. The invention may also work in reverse by providing dynamic pricing as a function of Internet advertisement costs. In a preferred embodiment, the present invention is a virtual or physical e-commerce application with an interface. The interface has a global tool and an optional specific tool for every product that is sold on a particular site. The e-commerce site has access to several vital pieces of information which provide the interface. A net margin is calculated via an import from an accounting package or a financial engine (this also may reside as part of the functionality of the-e-commerce package) or be a fixed field in the e commerce package. A real time understanding, of the real cost of a click through or other advertising mechanism at an ad inventory tool which exists either as an automated tool to login to the Paid Performance interface or a field for a static pricing. Other embodiments use pooled performance data in virtual storage to generate a target price from a desired product margin.

The user can defines much of these factors and then the automated tool, in real time can either change the bid/cost of a procurement of a click-through or dynamically change of the price of the product to accommodate the margin desired on a global or product level basis and the variable expense of advertising. The present invention also integrates a dynamically presenting a unique price to the consumer as the consumer has a history of tolerating a different pricing structure, this can be based on innumerable parameters such as state, zip, title, etc. Also contemplated is integrating and tolerating pricing based on shipping costs tax tables, quantity discounts, or up-selling and cross-selling.

BRIEF DESCRIPTION OF THE DRAWINGS

FIG. 25 illustrates a sample comparison tracking method for the telephonic sales channel supplemental embodiment.

FIG. 26 shows the data flow in telephonic sales advertising channel bidding and routing system for e-commerce advertising channel keywords in the toll free supplemental embodiment.

MODE FOR THE INVENTION

The following illustrations and descriptions are meant to assist in the understanding of the invention and are meant to be representative examples of the manner in which the present invention may be implemented. As such, they are exemplary and not limiting. In a preferred embodiment, the present invention contemplates the key word auction as the primary method by which the invention will be implemented. Of course, other customer procurement mechanisms or Internet advertisements and "metrix" are contemplated in alternate embodiments of the invention.

In the following detailed description, components are often referred to in plural.

These components are often numbered as "19(n)," where n is meant to imply an integer or count of the components. Thus, if there are four devices for which 19 stands for 19(n) is meant to refer to all items 19(1), 19(2), 19(3), and 19(4). The first in a set is referred to 19(a) and the last in a set will be indicated by 19(z). Thus 19(n) will generally mean 19(a) . . . 19(z) unless otherwise indicated. Where there may be singular distinctions made between the plural components, the individual number ("19(4)") will be indicated. Where there are intended to be plural subcomponents of a plural components, the number indication will be made as "19(n,n)."

Figure 1:
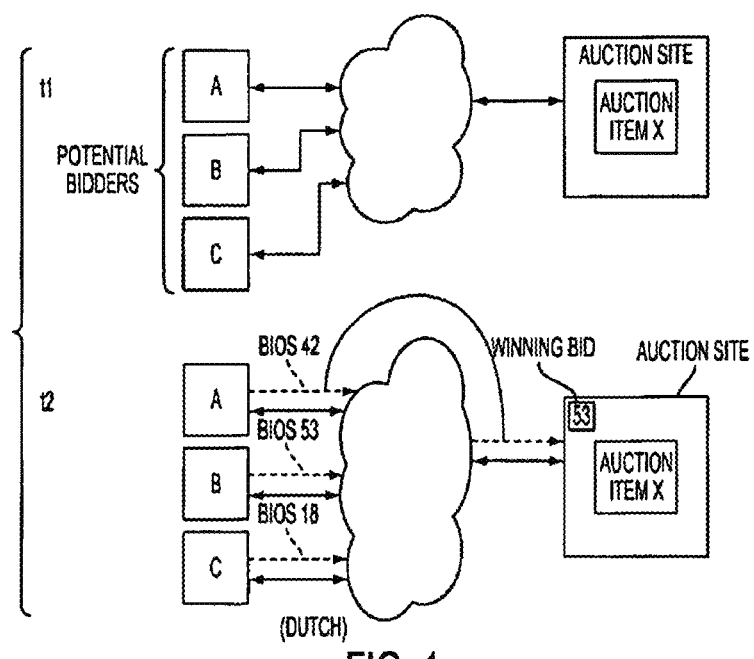
FIG. 1 represents the current art in the acquisition of a customer procurement device (simple Dutch auction).
Figure 2:
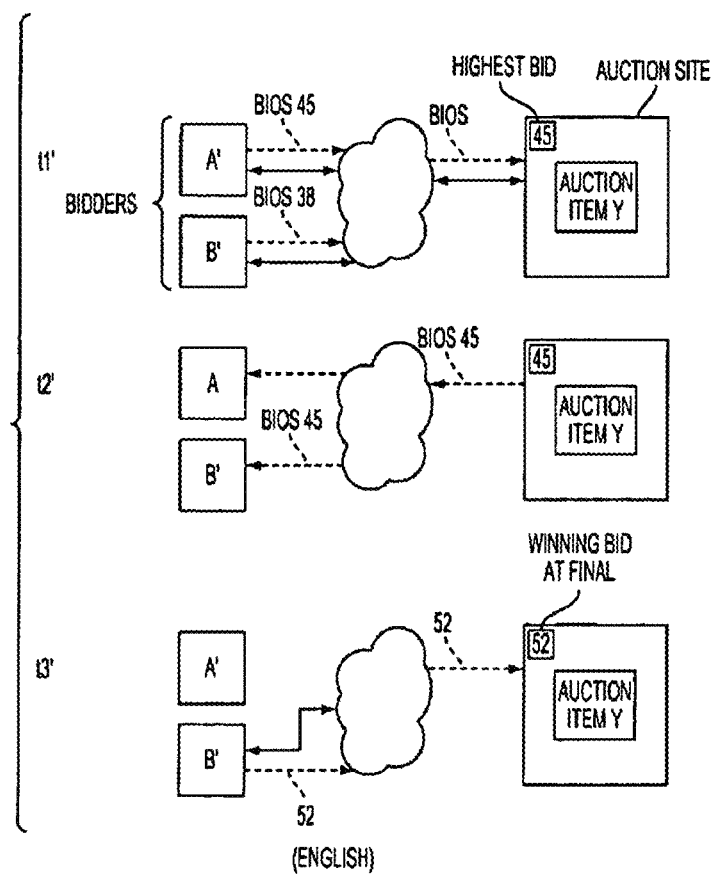
FIG. 2 depicts a timed auction mechanisms used over the Internet.
Figure 3:
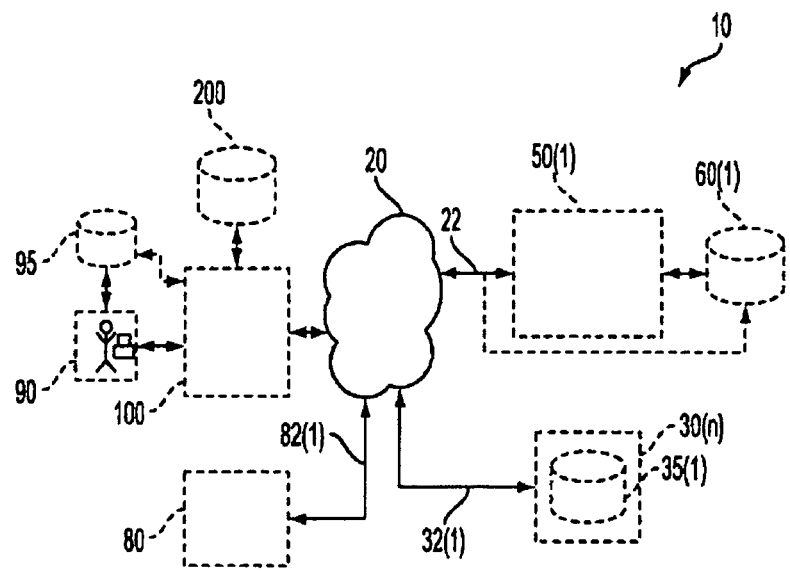
FIG. 3 depicts a basic block diagram of the present invention.

Referring now to FIG. 3, a simplified diagram of a first embodiment of the e-commerce interface 100 is shown. The e-commerce interface 100, can be represented as sitting virtually between the bidder/procurement agent system 90(n) and the network 20. The e-commerce interface 100 is shown to be virtual as can be appreciated by those skilled in the art, as it may be implemented on one or more computing machines that are separate from the e-commerce interface 100 but connected to it. The e-commerce interface 100 is connected internally or externally to virtual performance data storage 200 and a wide area network 20, which in a particular embodiment is the Internet. The system 10 also includes at least one search engine site 50(n) on which a customer procurement device may be obtained The search engine site 50(n) may include physical or virtual computation 60(n). The search engine site 50(n) is connected to the network 20 through a connection 22(n). The system includes one or more optional vendors 30(n), with a virtual computation device 35(n) connected through connection 32(n). An optional consumer purchaser 80(n) may also be part of the system and connected to the network 20 through connection 82(n).

Figure 4:
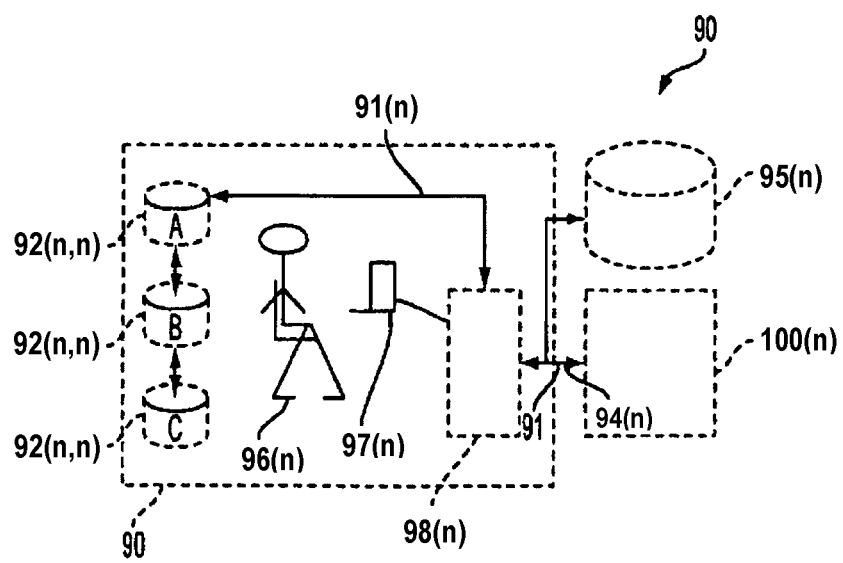
FIG. 4 shows the simplified elements of a user stations.

FIG. 4 is a simplified illustration of an individual user/bidder system 90(n) as may be used in the present invention. Many variations of the station 90 may be implemented as can be appreciated by those skilled in the art. The user system 90(n) includes a computation device 98(n) which can be one or more computers or part of a computer. The computation device 98 is connected to an optional user interface 97(n), which may be a personal computer or workstation through an internal or external bus or communication line 91(n). Optionally, there can be individual or amalgamated product servers or databases 92(n,n), which may keep inventory, pricing, availability, shipping costs and other information updated. These servers or databases 92(n, n) may be each single or multiple computational devices or all included as part of a single virtual machine and part of a larger computing machine. A financial engine/database 95(n) may be part of the computation device 98(n) or a separate computation device or computer. A user 96(n) may be a person, a group of people, an e-commerce system, a computer or automated system or any combination thereof. The connection to the e-commerce interface 100 is provided by virtual connection 94(n). Virtual connection 94 may be any combination of internal buses, external buses, communication lines (Ethernet, T1), or software links and may overlap with many other connection structures. These structures are shown to be virtual and may be have physical embodiments that that are implemented in a variety of ways. E-commerce interface components which are local or particular to a user system 90(n) are indicated by 100(n).

Figure 5:
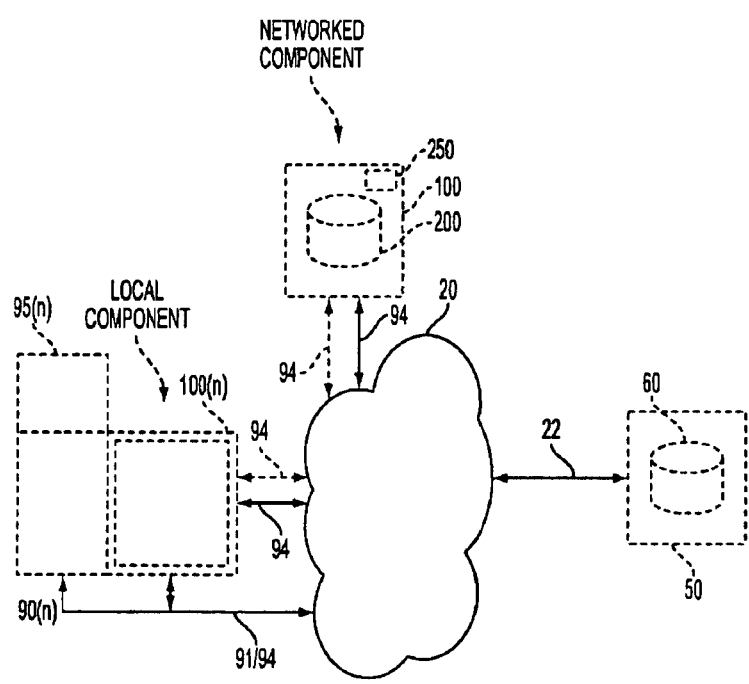
FIG. 5 represents a block diagram of an embodiment of the e-commerce interface.

FIG. 5 is a simplified block diagram of the e-commerce interface 100 as may be implemented in the present invention. Once again the parts are shown to be virtual and may be embodied and executed on one or any number of computing devices. The e-commerce interface 100 is run on a virtual implementation computer 250, which can include real or virtual storage 200, which is used to store the performance of customer procurement devices for various purchases on one or more search engines 50(n). The e-commerce interface 100 is connected to the virtual storage 200 through a communication system 190, which may be an internal or external bus or a network or other communication line, such as T1, Ethernet, etc. The global tool 185 may be the virtual computation engine which collects data and executes the computational instructions in one embodiment. The connection interface 105 virtually or physically connects the global 185 and product 150(n) tools to one or more computation devices 98(n) and optionally the financial engine 95 and network 20. The e-commerce interface may also include optional product tools 150(n) which may be for individual or set of products lines. As such, they may be linked to the individual product databases 92(n,n) in the user systems 90(n), but they are not required to be linked. Virtual data link 160 may be part of the virtual connection 94 or the communication system 190 depending on the implementation of the invention. Optional intelligence module 198 may be included in the virtual implementation computer 250 or as part of the e-commerce interface 100. In a preferred embodiment the e-commerce interface 100 has a local implementation module 199(n), of which a part are instructions which may be executed on user system computation device 98(n) with access via virtual connection 94 to the e-commerce interface 100 over a network. This is shown in FIG. 5.

Figure 6:
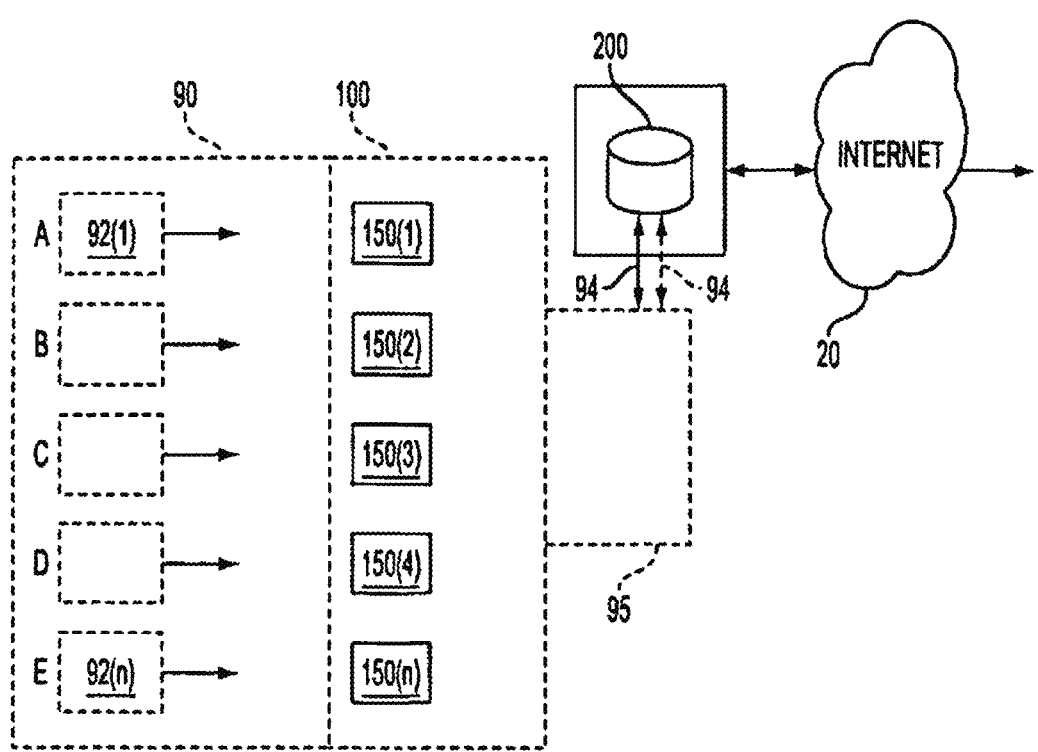
FIG. 6 shows the link between the individual product pricing databases.

FIG. 6 shows a simplified schematic of the local portion of an e-commerce interface 100(n) as would be used for multiple related products 150(a) . . . 150(z). As mentioned above, the product databases 92(n,n) in the user station 90(n) may be directly or virtually linked with the optional individual product tools 150(n, n) in the e-commerce interface 100(n).

Figure 7:
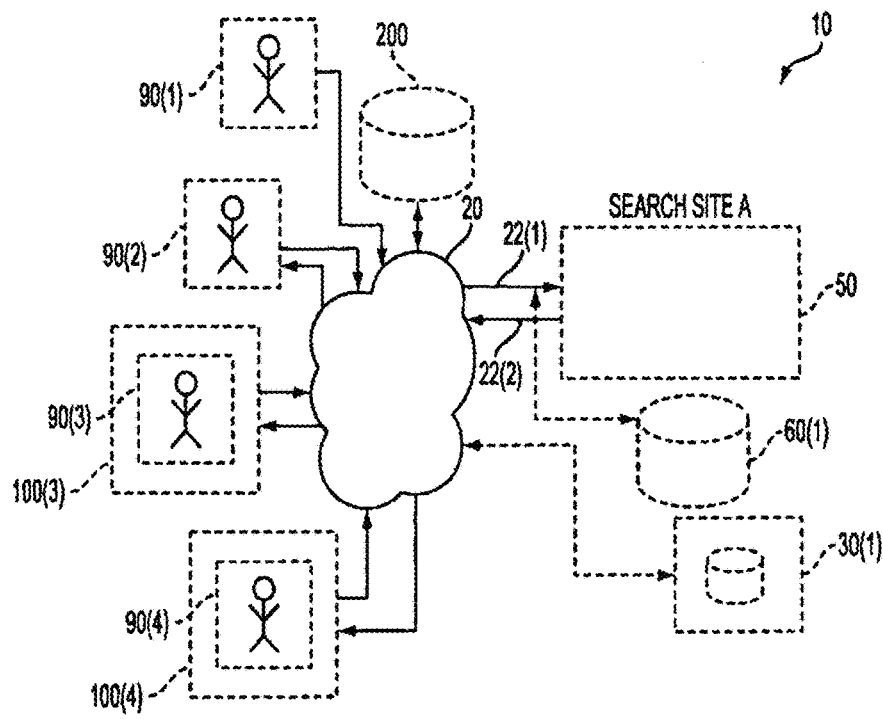
FIG. 7 represents an embodiment present invention in a simplified block diagram.

FIG. 7 shows a simplified illustration of a first embodiment of the invention as may be used in a typical keyword procurement scenario. In the illustration, there are 4 bidder systems 90(1) . . . 90(4) for a keyword on a single search engine site A 50. To illustrate the flow of information, inquiries or bids from bidders/users come into the search engine site 50 through communication in route 23 and information returning to the bidders/users returns through communication out route 24. User systems 90(3) and 90(2) have access to an e-commerce system 100(3) and 100(2) as contemplated by the present invention. The access may be either direct or virtual.

For example, the e-commerce system 100 could be accessed as a subscription service over a private or public network and either run on a central server or a java virtual machine at the individual bidding systems 90(n) or a combination thereof.

Figure 8:
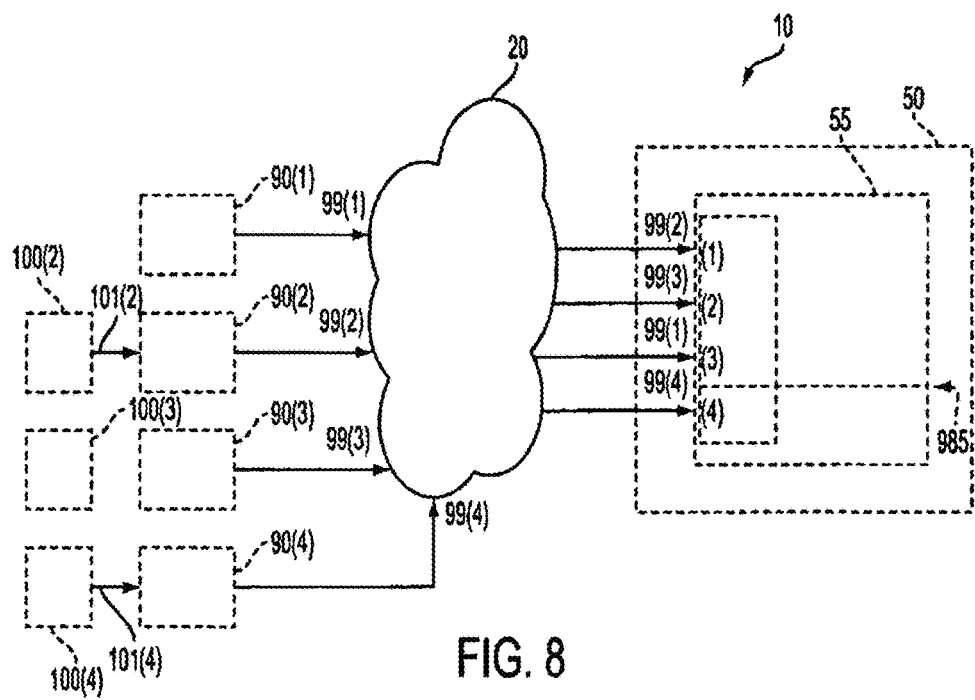
FIG. 8 represents a bid delivery system as would be implemented by an embodiment of the present invention (dutch or sealed bid auction).

FIG. 8 represents a "dutch" auction embodiment of the present invention shown in FIG. 7. The dutch auction has a blind single-bid system in which the highest bidder simply gets the highest position, second highest bidder gets the second position and so forth. Each user 90(n) supplies an individual bid 99(n) via the network 20 and connections 22(n) to the single site selling the keyword 50. E-commerce interfaces 100(n) supply the recommended bidding price based on the computation to each user system 90(n). The recommended bid 101(n) can be automatically supplied as the individual bid 99(n) to the site 50, or a human or computer user may screen it and accordingly or post it, allowing for a range of optional automation options. In the shown embodiment the bids are placed in a virtual bid collector 55, which may be on the site 50 selling the keyword or on another e-commerce processing site (not shown). The bids 99(n) are posted and the winner 99(2), in this case, gets position 1, 99(3) gets position 2, etc. The virtual bid cutoff 985 represents where the minimum bid lies to get any exposure or procurement (in this case three placements are offered). As can be appreciated, there could be a single exposure or any number of positions being bid for a keyword or other customer procurement device on search engine site 50.

Figure 9:
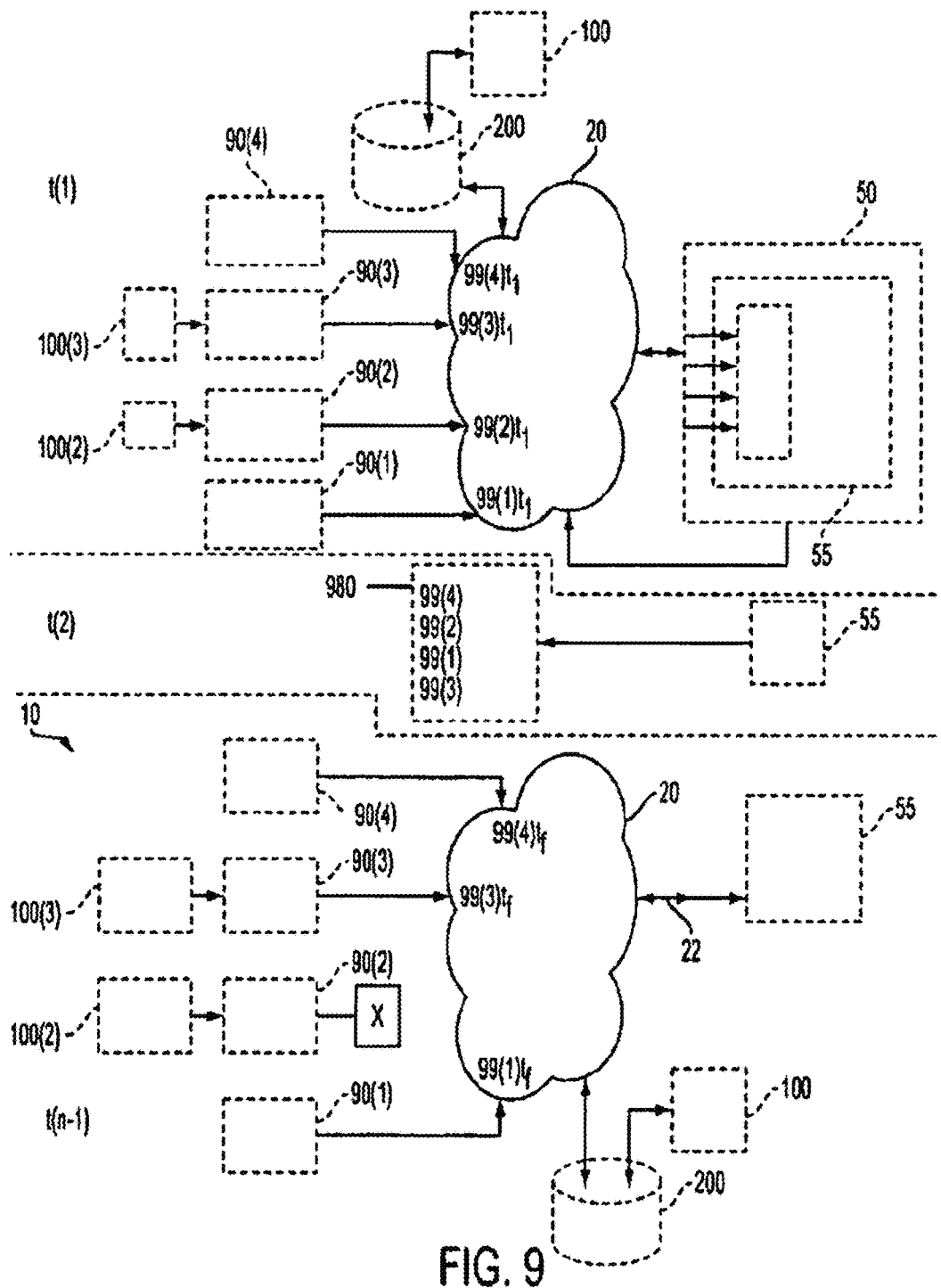
FIG. 9 represents a bid delivery system as would be implemented by an embodiment of the present invention (english or time-based multiple bid auction).

FIG. 9 represents a multiple bid, timed auction scenario in the present invention in FIG. 7 ("english" auction). In this illustration the bids 99(n) are placed in the bid collector 55. However, at time t(2), the bids are posted at virtual location 980 so that the users/bidders 90(n) may access the other bids. The e-commerce interface 100(n) can access this location 980 in order to re-compute an appropriate bid for the customer procurement device. Obviously, this process may occur once or many times as the rules of the auction may vary. At time t(z-(increment)), the bids will become final. In the illustration, e-commerce interface 100(2) has determined that user/bidder 90(2) should no longer be involved in the bidding and this is indicated by an "X." However the three other users all submit final bids 99(n').

Figure 10:
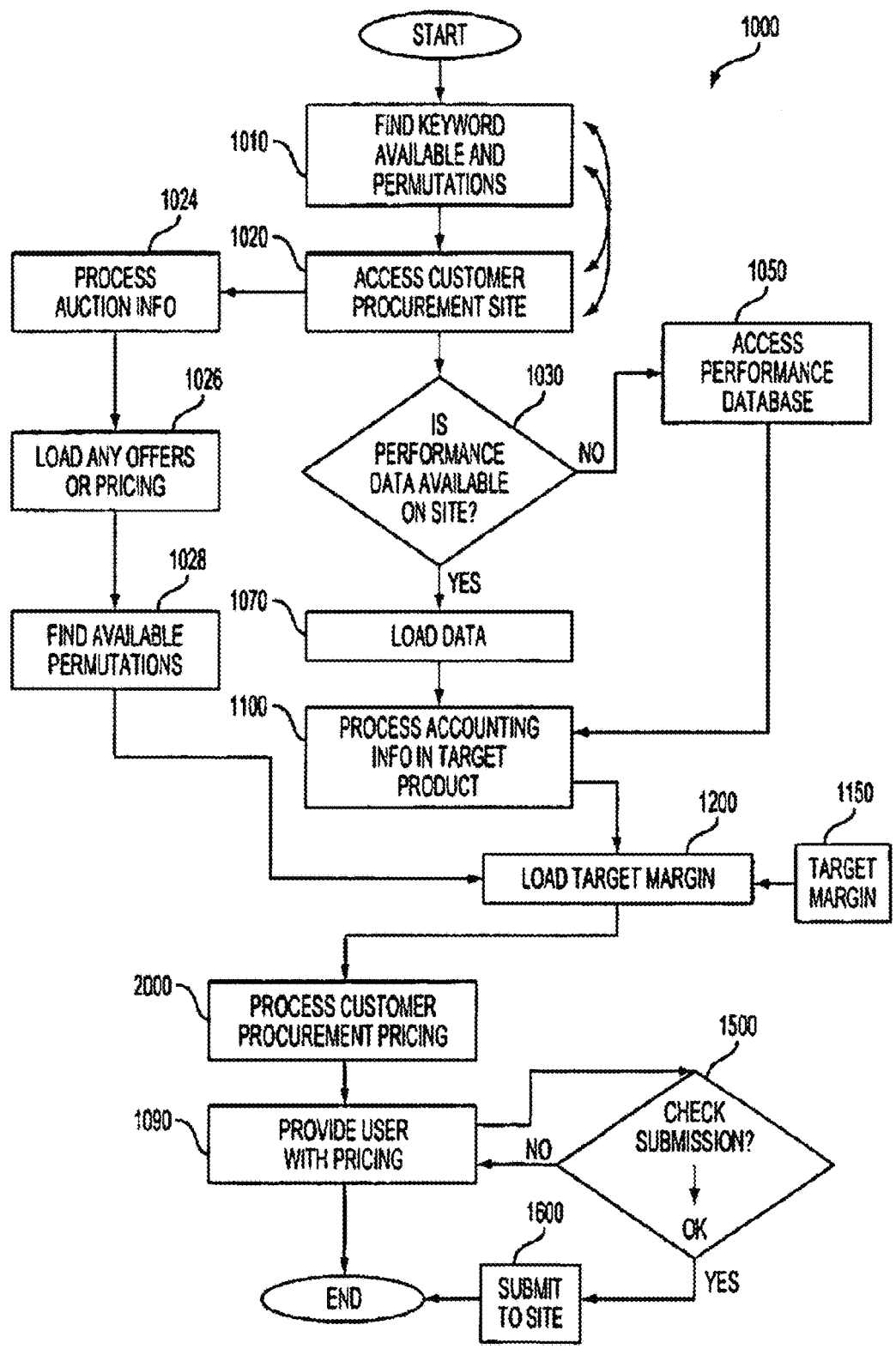
FIG. 10 shows a method of providing a keyword auction price through an embodiment of the present invention.

Referring now to the flowchart represented in FIG. 10, a simplified depiction of the method 1000 for practicing an embodiment of the present invention is described. In step 1010 available keywords and potential permutations are determined either by a user or a machine. Such a step could simply be performed manually, or could be an automatic search run by the e-commerce interface 100 or another program on the user computation device 98(n). The site 50 on which the keyword or permutation is found is accessed in step 1020. Steps 1010 and 1020 may be performed in either order. In step 1030 the e-commerce interface 100 then determines whether performance data is available for the site 50. The performance data may be available from the site itself 50, in which case it is loaded into the e-commerce interface 100 in step 1070. If not available, the e-commerce interface 100 accesses a performance database in step 1050, either created by a third party or through amalgamated data collected by one or more e-commerce interface 100 transactions. It may also be stored on the virtual storage device 200, which may be accessible as part of a subscription service or provided as part of the e-commerce interface 100 with optional levels of access.

Simultaneously while the above steps are being performed, the auction data is accessed in step 1024, and the pricing or other offers (in an english auction) are accessed and loaded into the e-commerce interface 100 in step 1026. Optionally, the system can access pricing and/or offers on available permutations of the keyword in step 1028, if appropriate.

In step 1100, the accounting information on the target product or group of products is accessed by the e-commerce interface 100. This information may be included in the e-commerce interface 100 or calculated and accessed by the user's accounting package or financial engine/database 95. Depending on the structure of the entity, this information may be stored and computed on the individual product or product subset servers 92(n) or in the product tools 150(n).

In step 1200, the target margin is loaded into the system. This step may happen out of sequence as the determination of the target margin in step 1150 may be time independent of some of the other steps as in pre-determined. Choosing a target margin may be as simple as a mandate from an officer of the company and stored in the financial engine 95 and loaded in step 1150. The target margin may also be entered by a human user for each relevant event, such as an auction or at particular discrete times like calendared or fiscally-related events, if appropriate. In step 1300 (discussed below), the e-commerce interface 100 processes the site 50 performance data, target margin, keyword pricing, accounting information, and global and product variables to provide the user (machine or human) with a target price in step 1090. In optional step 1500, the e-commerce interface 100 checks to make sure that the keyword bid is appropriate before submitting as a bid it in step 1600. These steps may be included as part of the optional automated keyword bidding embodiment described below and shown in FIG. 21.

In the particular embodiment shown, a non-sequential and independent step, step 1150, a field is dedicated to what percentage the user is willing to spend as a variable expense of advertising (VAREXP) or what net margins (NETMAR) the user desires. The generation of these variables is discussed below in detail.

Figure 11:
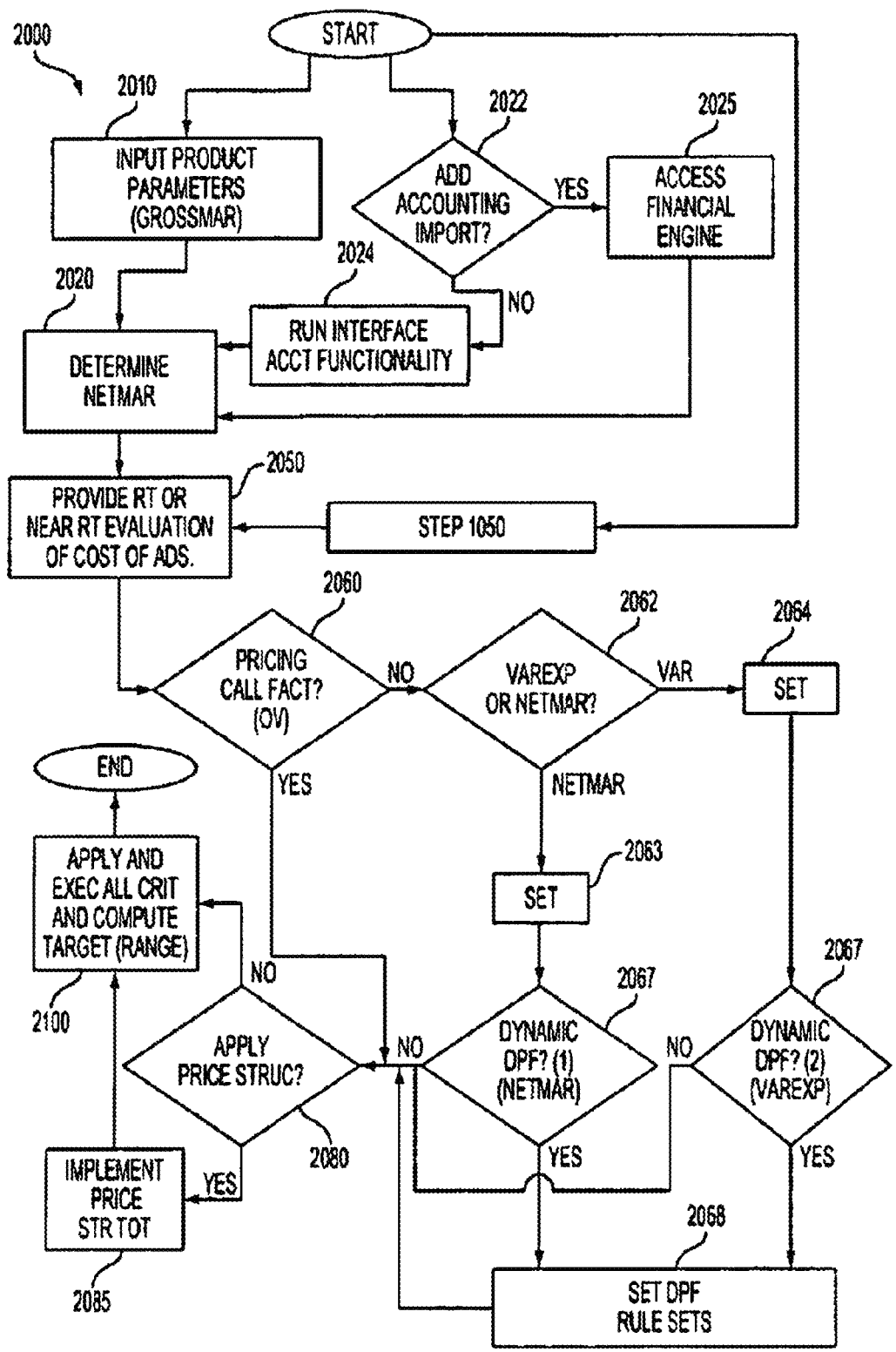
FIG. 11 is a flowchart showing a sample method of computing a target bid.

FIG. 11 shows a method 1300 for dynamically setting the target cost of a click-through in a particular embodiment. In step 2010, the e-commerce interface 100 determines a net margin from a gross margin (GM) from accessed information including: price of a product (PRICE); wholesale price of product (COGS); gross margin (GRSMGN) calculated from the PRICE and COGS. In step 2020, the (NETMAR) net margin (or other appropriate accounting benchmark as discussed below) is calculated via an import from the company's accounting package which may be executed on the financial engine 95 in step 2025. An accounting package may also reside as part of the functionality of the-e-commerce package 100, either centrally 100 or locally 100(n)) or simply reside as a fixed field in the local e-commerce interface 100(n) for simplification. This step may be practiced with variation without departing from the scope of the invention. For example, the financial engine 95 may track inventory and reduce price based on aging products, and, therefore, the product subset servers 92(n) are in communication with the accounting package 95, which updates the pricing and entity's financial records (not shown) and returns the new pricing data to the product subset servers 92(n). Although it is not important to the invention how such updating and internal pricing are accomplished, it is contemplated that the e-commerce interface 100 and in particular the global tool 185 have speedy access to the information in both of these virtual structures 92(n) and 95 (which may be the same structure) in order to generate timely information. Of course, for some entities the use of the global tool 185 may use unnecessary computing resources when In step 2050 a real-time or near real-time evaluation of the real cost of a click through at a customer procurement device inventory tool (ad inventory tool) is accessed and evaluated.

These ad inventory tools may be like those included in such search engines as Overture™, Google™, LookSmart™, FindWhat or other appropriate site 50. The real-time evaluation may exist in alternate embodiments either as an automated tool to log in to the Paid Performance® interface or equivalent, which is accessible by the e-commerce interface 100, or through a humanly or machine entered field for static pricing (STATPRICE). Step 1050 is one way in which this may be provided as well.

In order to assess an outcome variable (OV); a series of optional user contingency variables and evaluations CV(X) may be added in step 2060 et seq. if they are warranted. These pricing calculation factors may include choosing whether the controlling parameter is a variable expense of advertising (VAREXP, see above), at steps 2062-2063, or net margin (NETMAR, see above), steps 2064-65.

Whether certain pricing structures will apply in steps 2067-68 is dependent of the controlling parameters for the outcome variable. Other optional dynamic pricing factors in the e-commerce interface 100 applied at this step include: whether different shipping which is based on accounting different shipping tables and pricing based on shipping costs (SHIPCST), different tax tables for accommodating different pricing structure (TAXTAB), quantity discounts based on above rule sets (RULEDISC), and up-selling and cross-selling (XSELL) based on rule sets which are stored either locally or globally or apply at global or product levels.

At step 2100 the particular rules are loaded of the particular rules and application step for determining a target price this step is described below.

In a particular embodiment of the invention, the user defines much of the above and then the automated global tool 185 or one or more product tools 150(n), in real time can either change the bid/cost of a procurement of a click-through or in an alternate embodiment dynamically change the price of the product to accommodate the margin desired on a global (NETMAR(global rule) or product level (NETMAR (P1,P2), where P1 is a rule for one or more products) basis. The VAREXP or the variable expense of advertising (VAREXP(global) or VAREXP(P1)), see above) or cost acquisition of customer procurement devices can be used for outcome determination and in a particular embodiment is defined on the product level (VAREXP(product rule)) by the admin functionality of the user system 90(n) or of the e-commerce interface 100. However, it is typically expected that this variable would be mandated by a VP of sales or a CFO on a global or product level basis.

In an alternate embodiment of the present invention the result is that the e-commerce interface 100 may also dynamically present a unique price to the consumer, as the consumer has a history of tolerating an alternate pricing structure (consumer dependent pricing structure), which can be based on innumerable parameters such as state, zip, title, etc. as there many types of these alternate pricing structures which can be chosen to implement dynamic pricing. If it is determined that alternate pricing structures apply in step 2080, the particular details are indicated in step 2085. These is factored into the dynamic pricing system at step 2100 (described below) based on the user preferences for alternate pricing mechanisms.

Figure 12:
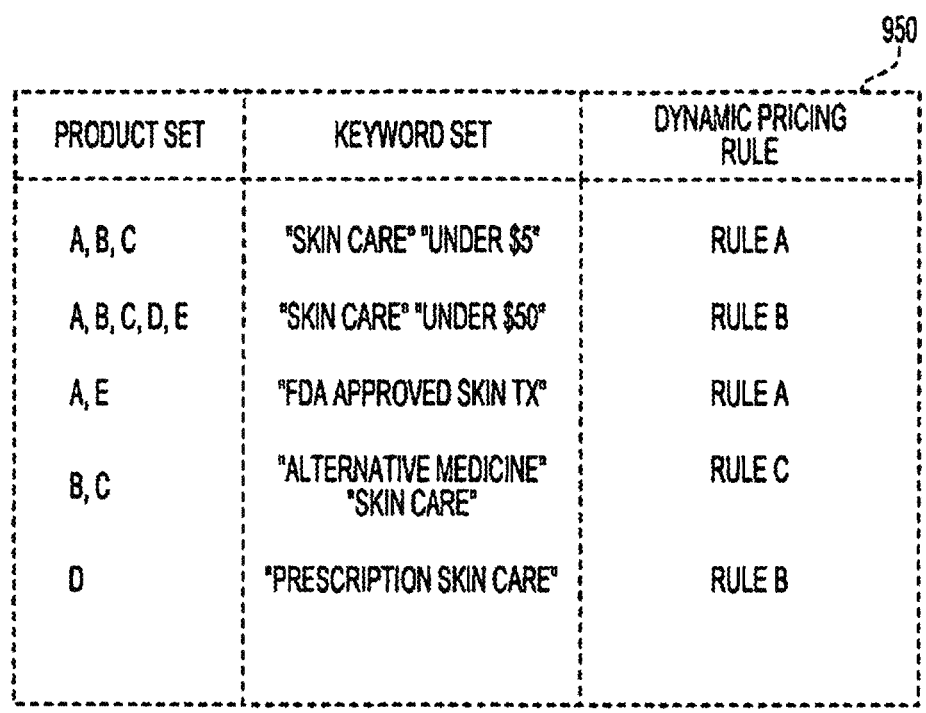
FIG. 12 represents a grouping of subproducts based on pricing relationships.

Of course, in a preferred embodiment of the present invention is primarily designed to assist in the acquisition of customer procurement devices by providing dynamic pricing (price target ranges) to assist in the acquisition of such devices. In alternate embodiments, the present invention can assess pricing of one or a define set of products based on the cost of advertising (VAREXP) or using the cost of customer procurement device acquisition simply as part of the dynamic pricing model. As can be appreciated by those skilled in the art, a set of related products may or not be connected through acquisition of different customer procurement devices and thus may have different pricing considerations for each acquisition. This is shown in FIG. 12, a virtual product pricing relationship table, 950 which may be store locally or in virtual storage 200.

Figure 13:
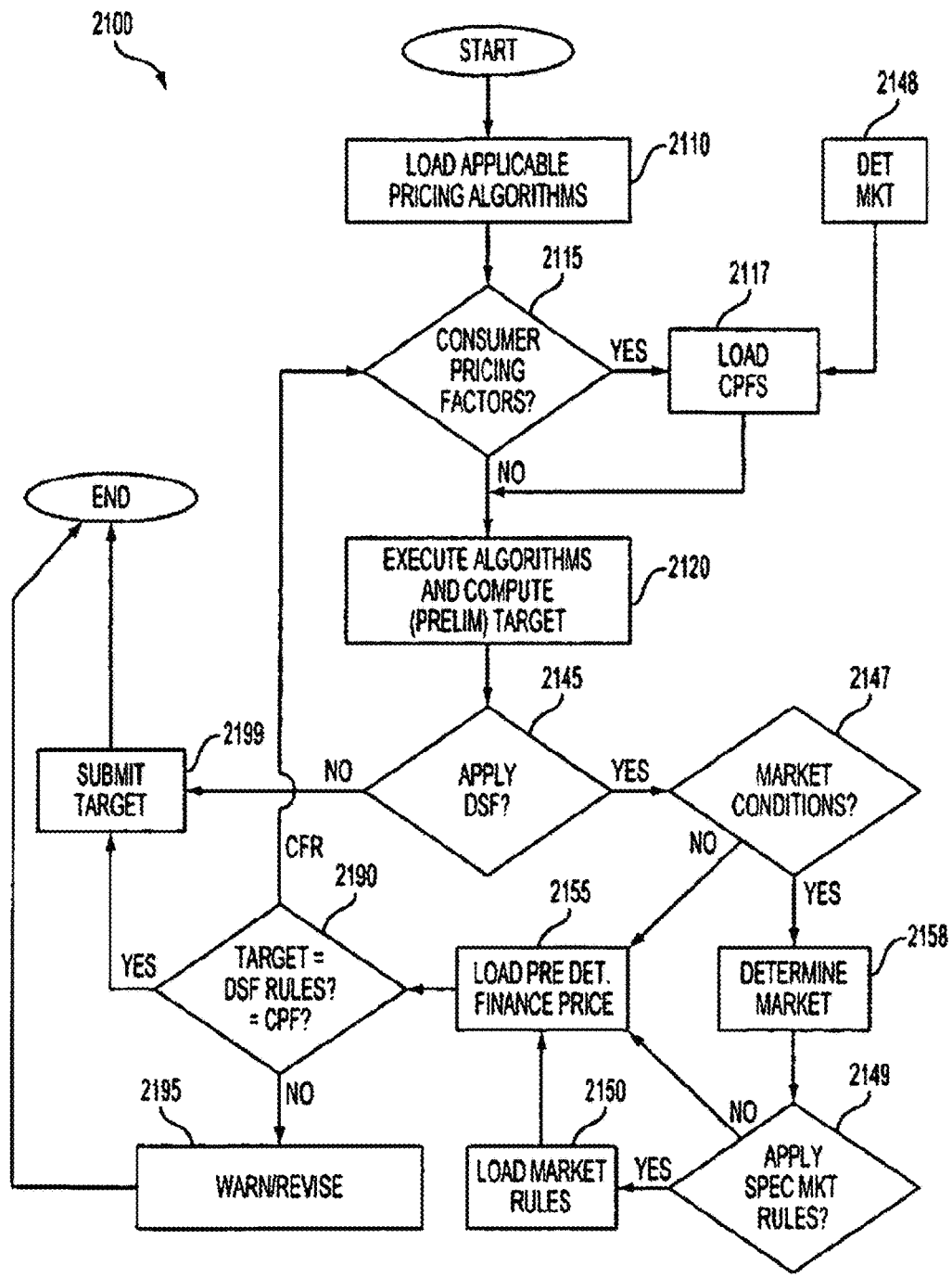
FIG. 13 shows a method for dynamically computing a keyword price.

Referring now to FIG. 13, step 2100 is shown in greater detail as to steps in a particular embodiment for dynamically determining a target price. The algorithms that have been determined to apply for the pricing rules are loaded in step 2110. It is determined if consumer pricing factors apply in step 2115 and if so, they are loaded in step 2117. Any consumer pricing factors (discussed above) may optionally be determined by determining market conditions in step 2148, if such conditions are available for pricing. A preliminary target price is computed in step 2120. In step 2145 it is determined if a decision support factor (DSF) is to be applied. If so, in step 2147 the interface 100 determines whether market conditions apply to the DSF or are available. If so, the market conditions are located in step 2148. In step 2149, the interface 100 then determines if the market conditions warrant application of market-based DSFs (discussed below), and if so, in step 2150 the market-based DSFs are loaded into the system. Other accounting and financial rules, which are not based on the market conditions, may be applied at step 2155. In step 2190, the interface 100 determines whether the target price meets the DSF rules or consuming pricing factors. The interface can revert to step 2115 if new consumer pricing factors need to be loaded or if DSFs indicate an unacceptable situation, can warn the user in step 2195. If all DSFs are satisfied, the target is submitted in step 2199.

Such decision support factors may take into account both global and specific accounting and marketing principles and range from the simple to the complex. Such decision support factors may also provide the user with adequate warnings when the advertising procurement or product pricing is not within a set of acceptable parameters. For example, a novice may wish to sell 100 G's at $20.00 each with a profit of $15 per sale (expected profit $1,500). The cost of a click-though may be $0.25, which appears reasonable to the novice. However, the performance tool indicates to the e-commerce interface that over an hour there will be 10,000 click-throughs ($2,500!) and a conversion rate of 1:50. Thus, the novice will be purchasing enough performance over an hour to sell 200 and will not be able to derive any profit past the sale of the last of the 100th item. Thus, there is expected to be a $1,000 loss, even though selling 200 would result in a profit of $3,000. While this is a relatively simple example of a decision support factor being applied, the dynamic relationship between open-ended advertising costs, product pricing mechanisms, and generating market share provided by the present invention provides much-needed support not contemplated by any relevant art.

Figure 14:
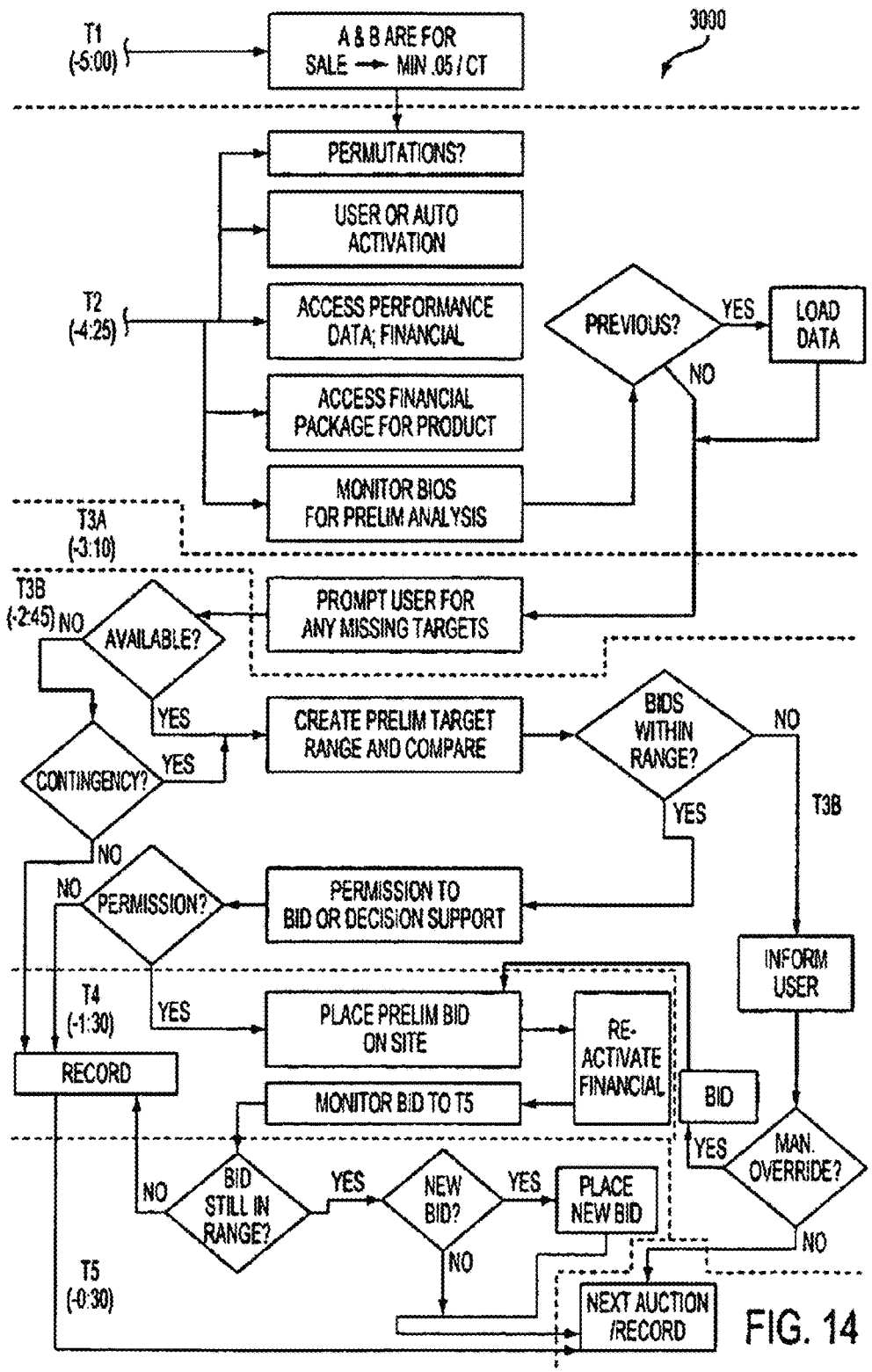
FIG. 14 shows a method for applying the present invention in a time-based auction.

In a simplified sample procurement engine method implemented in one embodiment of the invention, a method 3000 for real time or near real time application of the e-commerce dynamic pricing tool is shown in FIG. 14. In this example, the auction for keywords is taking place for five minutes and will accept bids up to the closing time. It also posts all bids in five second increments. The time intervals from t1 to t5 given below are examples and not meant to indicate that the e-commerce interface 100 is limited to specific time intervals. However, as can be appreciated by those skilled in the art, there may be a calculation for strategic timing of specific acts, like evaluating and placing bids, for which the e-commerce interface 100 may be particularly well suited for both evaluation and execution purposes and an optional part of an alternate embodiment. The following example also illustrates the suitability for the present invention in such a time-constrained acquisition environment.

At time t1 (−05:00), the customer procurement device engine informs a user that desired keywords ($A,$B) are being auctioned for time period (Y to Y+INTERVAL). The bidding of click-throughs starts at $0.05, which the e-commerce interface 100 monitors.

At time t2 (−04:25), the e-commerce interface 100 accesses any performance data available either through the search engine sites 50 or through the accumulated data stored in the virtual storage 200. Also, at time t2 the financial engine 95 is accessed for relevant information on a target product or set of products. The individual product databases 92(n) may have to be accessed at this time as well, if there is not a continuous update. The e-commerce interface 100 also screens for potential permutations or variations of the keyword that may be available and beneficial to the user. This aspect of the invention is discussed below.

For auctions that use the open bid, like the english auction model, at this (or another) time interval, the e-commerce interface 100 accesses the early bids for the keyword. Such early bids may provide the global tool 185 or product tools 150(n) with valuable information in computing the target keyword price range. In particular embodiments, previous bid information may be available, not only as absolute pricing information, but in the timed bidding aspect as well. Thus, the e-commerce interface 100 has optional built-in artificial intelligence module 198, of which one of the functions is detecting pattern to (timed) auctions and developing a rule in calculating the pricing target. In the background section, there are several patents and publications relating to electronic auctions are discussed, and those patents and publications are hereby incorporated by reference for all purposes, and in particular to illustrate the details of electronic auction and related transactions.

At time t3A (−3:00), the e-commerce interface 100 prompts the user 96 (or user/machine) for any missing information that must be entered. If the user 96 cannot enter the information, the interface 100 will have standing or contingency instructions as to whether it should continue in the keyword auction.

If the bidding is to continue, at time t3B (−2:45), the e-commerce interface 100 determines whether a bid is within range of the calculated target price. If it is within range, then the bid is either passed along to the user for bidding, or is posted to the auction location. The permission may include any pre-registration features that auction participation requires such as registering a credit card or providing other personal or business information. Although it is expected that many users will have pre-registered, there may be advantages with not being pre-registered, as can be appreciated. Permission steps may also include any time of authorization by the user or officers, such as a comptroller, who may be monitoring the bidding manually or automatically.

If the bid is not within the target range, the user is informed that the bid has exceeded the target range. The user or other authorizer may then choose to override the target range and place a bid. Optionally, the bid may be entered manually and directly posting or the e-commerce interface 100 via the global tool 185 or product tools 150(n) which can adjust the new bid incrementally or by other factors back to the permission stage.

At time t4 (−1:30), if permission is granted, the initial bid is placed at the bid posting area 55, which may be on the search engine server or computing machine 60 or in another location, such as the transaction server for the auction. Any posted bids are monitored until the target ending time (t5), when the e-commerce interface 100 must assist the user with a final bid decision. Thus, all bids until the time t5-evaluation time are evaluated by the interface 100.

Also, at time t4, if permission is not granted, the data regarding the bids and target range are recorded by the e-commerce interface 100 as much as would be possible for future use and may proceed to the next available advertising sale. For example, an optional aspect to the invention is that it will gather data on customer procurement tools even when acquisition fails and store locally or globally in the virtual storage 200.

At time t5 (−0:30), with very little time left to go in the auction, the e-commerce interface 100 determines whether a new bid is warranted based on any new information, particularly new bids. If a new bid is warranted and still within the target range then the user is informed and/or the bid is posted to the bid posting area 55. If the bid is not within range any more, the e-commerce interface can opt out and simply record the data from the failure or prompt the user to determine whether the user wants an override. Of course, as can be appreciated the time intervals may be constructed to allow for various user options. Thus, in an embodiment where a user 96 manually posts a bid, there would be more time allowed than 30 seconds. Whether or not the customer procurement tool is acquired, the e-commerce interface 100 will record and store the data in a preferred embodiment for future decision support. However, if the customer procurement tool is acquired, other monitoring algorithms may be implemented in order to accurately determine value and performance of customer procurement devices.

In a highly simplified scenario, the following numbers may be included in a simplified calculation of the present invention: For seller A, on Sunday, from 1-5 pm, the keyword "skin care products" generates 17,500 click-throughs, 796 customers who purchase $4,117 worth of merchandise. 525 of the 796 sales were for skin care products.

TABLE 1.1

Sample variables for calculating the relative real cost of a click-through.

| Variable | Definition | Example |
| --- | --- | --- |
| Previous Price | Last procurement of "keyword" | $A = 0.17 per click-through |
| Adj. Factor | Time period normalization factors present? | (Sunday 1-5 pm) Y = N * 1.17 |
| CT Rate | Number of click-throughs per hour | 17,500/4 hrs = 4375 cts/hr |
| Conv. Rate | Customer procurement (actual purchase) to click-through ratio | 22:1 |
| Rev. per Sale | Gross revenue per sale | $5.17 |
| Ret. Cust | Return customers (from click-through sale) | = 12.7% (per 6 months) |
| Ret. Cust/CT | Return customers through click-throughs | = 5% (per 6 months) |
| Keywrd/Sale product | Customers who bought products related to the keyword (if more than one set of products) | 525/796 = 66% |

In this table the Sunday 1-5 pm slot gets 17% more traffic than the average daytime amount of traffic. Thus, the search engine auction for the skin care products keyword may adjust the lowest bidding price. However, the search engine may not adjust pricing at all, and the e-commerce interface 100 will have to account for such factors (if executed by the user) in order to accurately bid on a keyword. This table also represents previous data of one user during one time period. As can be appreciated by those skilled in the art, the collection of data for multiple entities or search engines for multiple keyword performances will require a great deal of computing power and data storage. The present invention contemplates that providing optional accesses by individual e-commerce interfaces 100 to a centralized data storage 200 and virtual implementation computing system 250 may be advantageous to all embodiments of the invention whether virtual or physical and regardless of location.

The above table is representative of summary data that may be provided by the search engine site, or collected by the present invention for each search engine or each user. It is also contemplated that a pool of users of the present invention collect their data in a central data storage such that the set of customers has access to alternate or better information regarding performance than the search engines.

Varying levels of data access may also be implemented in particular embodiments.

Table 1.2 Sample calculations used from variables in determining performance

Calc. Definition Example

GR/CT Gross revenue per click-through $4117/17,500

Acquisition Cost of any new customer sale PP of click-throughs (0.17*22)–12.7% (returning customer)=$3.29

Target/CT Margin of primary product or set of products for keyword per click-through ($1.27*450)/17500

Crossover Percentage of sale for unrelated prod. from a keyword "skin care"=34% xsell@$6.17 per sale Of course, these are highly simplified factors and calculations and are just some examples of how the present invention may use such variables and support factors to provide a target price to the user. As can be appreciated by those skilled in the art, there are numerous other factors that can be amalgamated into the decision many of which are listed in the specification. The specific set of variables that is applied will depend on many factors chosen by the user of the e-commerce interface 100 and the structure and implementation of the present invention. For example, global rules are more likely applied to embodiments of the invention that take the form of a subscription service.

Thus, the present invention contemplates that calculating the cost of a click-though will need to account for all the financial information related to a product and all relevant pricing information. There is no reason that the e-commerce interface 100, which includes the global tool 185 and product tools 150(n), cannot pre-configure or calculate much of this needed information in order to better conduct real-time or near real-time analysis while using less computer resources at time-critical periods.

A sample of database items from an accounting package executed on the financial engine 95 would be processed before auctions in order to generate any pre-configured parameters.

As stated above, rules for pricing based on the information may be applied in various ways without departing from the spirit of the present invention. Rules may be applied from a central location for a subscription service embodiment generated by virtual implementation computer 250 or applied on the user's computation device 98(n) in an embodiment of the invention that can be executed locally or both. Rule sets may be defined by both general principles of transactions and customization routines specific to particular entities. In the simplest embodiment the global tool 185 will apply a set of rules, which can be chosen by a user 96 in a setup configuration. Of course, the rule sets will change for each individual user 96 based on data captured and analyzed from previous customer procurement acquisition attempts by either the individual or collectively.

Table 1.3 Sample application of rules for pricing products
Scenario Rules for keyword procurement/product pricing
Pricing of one single item F Rule 1(A)
Pricing of multiple single items F (<2) Rule 1 (B)=15% discount
Pricing of multiple single items F (>25) Rule 1 (C)=15%+ 0.1 discount over 25ct.
Pricing of subset A (D,E,F,G) of total inventory multiple items Rule 2(B)=average of price of each item plus 15% discount
Pricing of any number of each item in total inventory (D-H) Rule (3,All sale)=only count average of 5 most expensive items and subtract shipping costs The above table provides for a highly simplified rule application by the global or individual product tools 150(n). Obviously, the more the sales of one or more products the less the relative real cost of a click-through. However, there are factors that may optionally be accounted for differently for each user of the e-commerce interface 100. For example in Rule 3, "all sale" would make sense for a large entity that had a large price range of products and low shipping costs and where only the higher priced items should be included in the calculation of the advertising procurement target range. However, Rule 1 (B) would be more applicable to a small entity with large shipping costs and small margin on product F (perhaps even a loss). Thus, the purchase of 24 items F does not provide the entity with a large profit over the sale of 2 and no additional discount is applied until 25, in which the shipping costs drop enough to make a profit, when Rule 1(C) would apply. Thus, Rule 1 (B) may be a good rule application where a site uses F as its signature product or customer draw to the website in order to sell more profitable products.

As stated above, it is not necessary for the invention to be limited to the pricing of advertising because the invention works in inverse as well to dynamically adjust the price of a single product, multiple single products or multiple sales of plural products. Thus, the price of F, which is the signature product of the company, and is sold at a loss, can be dynamically determined by the real cost of the click-through. The real cost can be constantly updated to improve the profit generated from a click-through or to prevent too many losses. For example, a click-through costs $1.00 and the profit margin of product F before advertising is $0.25. Thus for a click-through/conversion ratio of 10:1 for each single F sold, the more the company loses $9.75. However, if a purchaser buys 40 Fs at time, the company breaks even. Thus, the e-commerce interface will determine that if the click through/conversion ration improves or the average sale of F (or related and more profitable products) increases, the more the company can afford to lower the price of F based on a volume discount. However, if consumers are only purchasing a single F at a loss of $9.75 per sale, the e-commerce interface 100 can adjust the price such that losses are minimized.

The price determination may also account for other market factors based on usage, timing, etc., and is loaded at step 2150 and applied in step 2190. For example, a problem with any type of English auction bidding is that the experts generally submit bids at the last minute, hiding their true intentions and expert bidding from less experienced entities. Thus, less experienced bidders may overbid, driving up the price unnecessarily. Dutch auctions may eliminate the time pressure aspect present in the English auction for a keyword that drives the price upward toward the end of the bidding. Step 2149 may detect the situation and step 2150 applies a rule that 50 may account for this spike in keyword bidding and advise the user accordingly in step 2190. As such, the e-commerce interface 100 will have intelligence capabilities built into the global tool 185 and product tools 150(n).

As can be appreciated by those skilled in the art, the performance of a click-through has many variables involved not the least of which is often dependent on the search engine site itself. Of course, the metrics accumulated by the search engines themselves may be important criteria in showing the true value of a "click through" or an "impression" (or other advertising mechanism). As such, the present invention helps a user to successfully analyze of information controlled by the search engine services and gives a bidder for a customer procurement device real-time assistance in acquiring such advertising with all available performance data. Of course, payment for a "click-through" may be a fairly good indicator of how many people are responding to an advertisement, but really does not measure the cost-effectiveness in total. To some degree there may be some uncertainty built into Internet advertising performance measures, but the present invention can account for variances by accumulating and storing information for use in the e-commerce interface 100. Such data may be acquired in a single location or virtually and disseminated in the e-commerce calculation) as part of an alternate embodiment of the invention. As such, comparisons between search sites, keyword elements and permutations, and variations, among other factors, have already been discussed above.

Figures 15, 16:
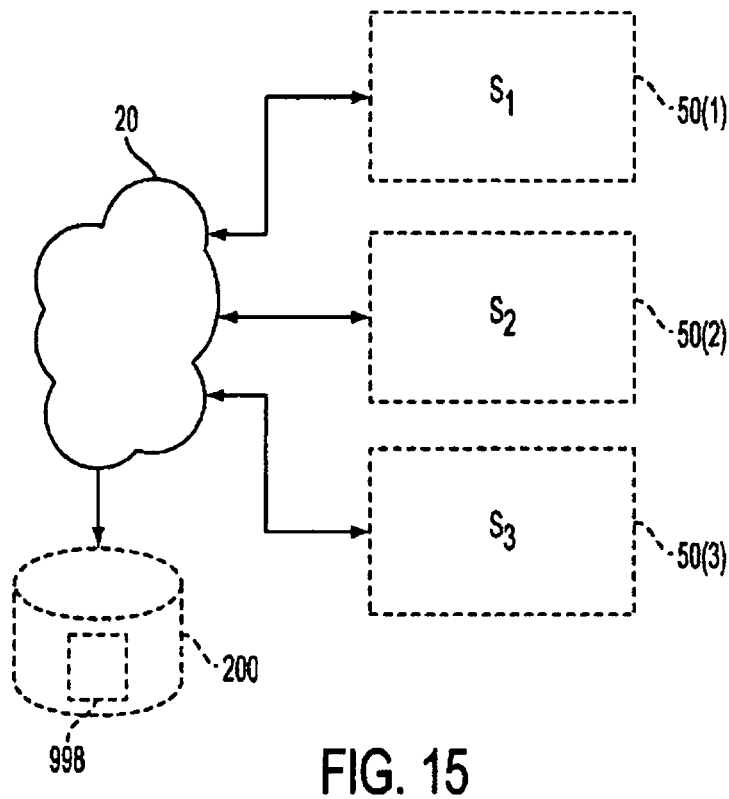
FIG. 15 represents a method for practicing the multiple search engine embodiment of the invention.
FIG. 16 is a sample contingency relationship table for acquisition of keywords over multiple search engine bidding.

Referring now to FIG. 15, a multiple search engine embodiment of the invention is shown. This embodiment simply has multiple search engines 50(1) . . . 50(n) on which keywords or other customer procurement devices may be acquired. This embodiment is similar to the single search engine keyword procurement embodiment described in FIG. 3, except that the virtual performance data storage 200 will have an inter-site comparison module 998. This module will access and/or store individual performance data-related sites and keywords and related information. A simplified example is shown in the table of FIG. 16, which compares the pricing and performance characteristics for three search engines 50(1) . . . 50(3), and is a table showing a sample database of table query as would be used by an embodiment of the present invention as used in the multiple search engine keyword acquisition shown. As can be appreciated by those skilled in the art, the factors used in determining an appropriate auction price may vary widely and take in account time of day, type of word, etc.

Figures 17, 18:
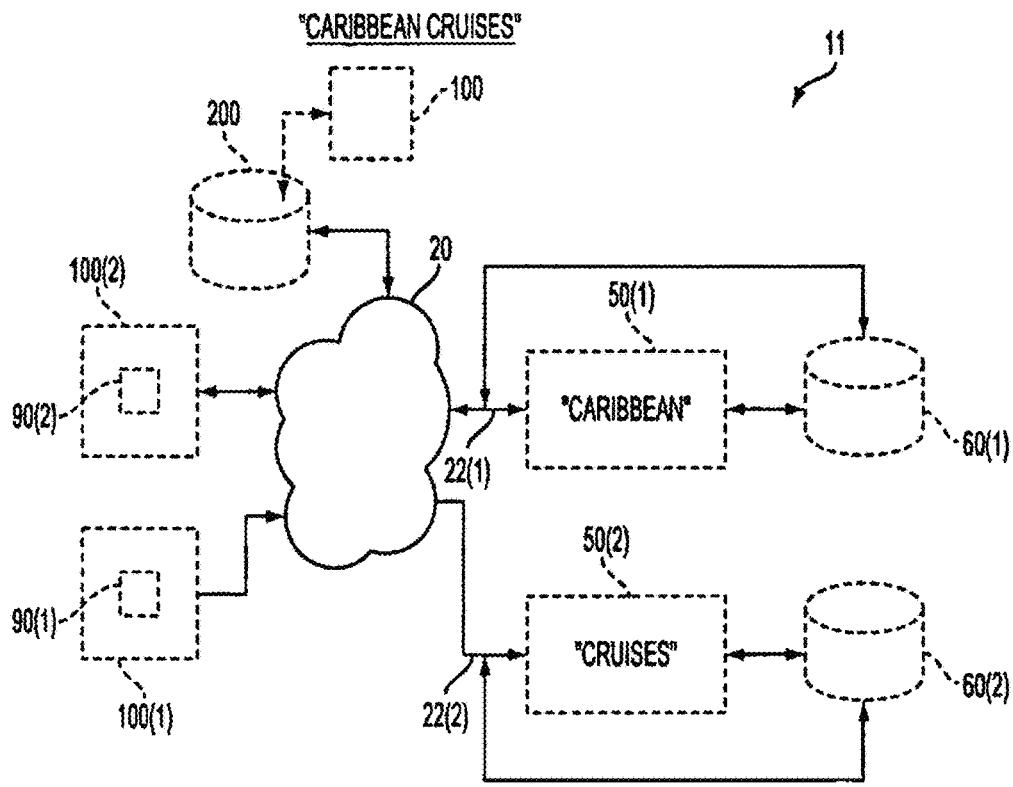
FIG. 17 represents a customer procurement device for multiple search engines and key elements.
FIG. 18 shows a comparison table used in the embodiment of the invention as shown in FIG. 17.

Referring now to FIG. 17, an embodiment of the present invention which factors in keyword "elements" for acquisition is shown. For example, entity A wishes to purchase "discount Caribbean cruises," which has proven to be an effective keyword tool for entity A. However, due to a recent revision of a couple of keyword systems, the desired keywords have been divided into different categories. Thus, "discount cruises" and "discount Caribbean" are available. However, e-commerce interface 100 has data that most of the keyword searches for cruises are in fact looking to go on a Caribbean cruise when purchased in January. Thus, the unavailability and competition for "discount cruises" may be high, but the purchase of the term "discount Caribbean" may be acquired at better performance-to-price ratios. The table shown in FIG. 18 is an example of how this calculation may be made.

Figures 19, 20:
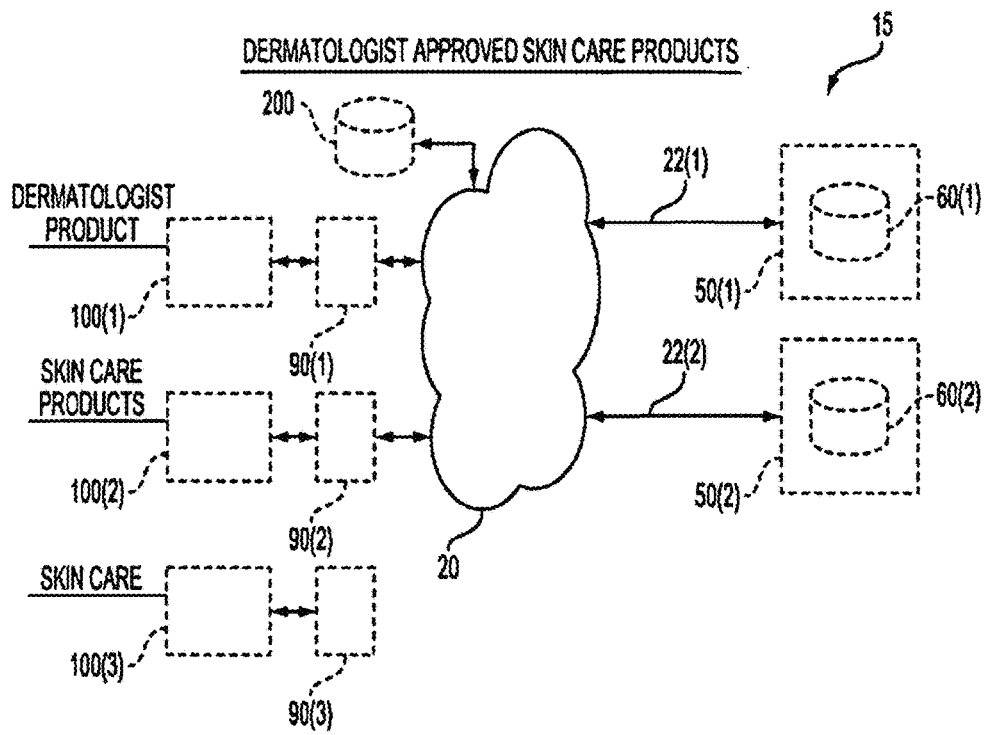
FIG. 19 depicts a system for analyzing multiple search engines, key word elements, and permutations.
FIG. 20 shows a simplified resulting relationship table for the system in FIG. 19.

Referring now to FIGS. 19-20, yet another embodiment of the invention that contemplates possible multiple search engines, key word segmentation and/or permutations is shown. By "permutations" at least two different types of things are meant. First, there are key synonym variations on the target keyword that are valuable for an entity which may recognize that targeting a small group of searches of a certain type can lead to improved sales. Second, as is common in keyword searching, spelling errors are fairly common in using search engines, and such misspellings may often be a valuable capture for an entity looking to capitalize on such exposure.

Table 2.1 Sample keyword permutations and weighting factors (type I)

Keyword Synonyms Relative Incidence per Target (/100) Relative Performance to Target (/1) Search Eng.

Adjustment Price Factor for Acquisition

"dermatology" 221.3 N/A Apply rule X

"dry skin treatment" 34.75 N/A Apply rule Y

"skin care" 55.65 N/A Apply rule Y

"dermatologist approved" 63.2 N/A Apply rule Z

Of course, rules X, Y, and Z are hypothetical financially based algorithms that are applied based on the target needs of the users. For example, rule Z may apply in situations where the incidence of the alternate keyword is very low (0.06), but the performance is very high (over 3 times normal). Thus, the value of this keyword may be higher based on traffic factors, like time of day, day of week, sophistication of the search engine, etc. Rules X and Y may be more straightforward, possibly even linear pricing factors. Furthermore, there is not enough data on this table to account for any search engine factor, but after the purchase of a keyword, or even through the accumulation of data by the search engine 50 itself, the data may become available. As stated above, this data may be available as part of a sales tool, or as part of a subscription or downloadable data service provided as a supplement to the present invention.

Table 2.2 Sample keyword permutations and weighting factors (type II)
Keyword
Variations Relative Incidence per Target (/100) Relative Performance to Target Price Factor for Acquisition Search Eng. Factor
"dermatology" 2.11.1 Rule A N/A
"dermoltgy" .7.87 Rule A N/A
"dirmotology" .4.89 Rule C N/A
"dermotological" .34.05 Rule B N/A The above table acts very much like table 2.1 in that it accounts for the past performance of mistaken spellings of the target keyword in order to provide a value for acquiring a misspelled keyword. Of course, not all keyword auctions or sales may offer the kinds of variations sales that are discussed in this specification. However, search engines and other advertisers may recognize the value of these variations either packaged as a bundle with the target keyword or purchased for "residual" value by other entities. Certainly, a purchaser of a bundle of keywords, which include synonyms and misspellings, may resell one or more of the set to another entity. The present invention contemplates the resale of such keywords in order to maximize the value to a user. For example, a purchaser who buys words A, A', and A" for 32 cents a click-through may find that keyword A and variation A" are valuable for customer procurement and sales of product X1, but A' is not useful. Thus the purchaser desires to sell A' to a subpurchaser who may benefit from using it in the sale of products Y1 and Z1.

In a preferred embodiment, the present invention contemplates the key word auction as the primary use of the method by which the present invention operates.

However, as can be appreciated by those skilled in the art, other types of purchases for various types of customer procurement mechanisms may be acquired though the teachings of the present invention.

Figure 21:
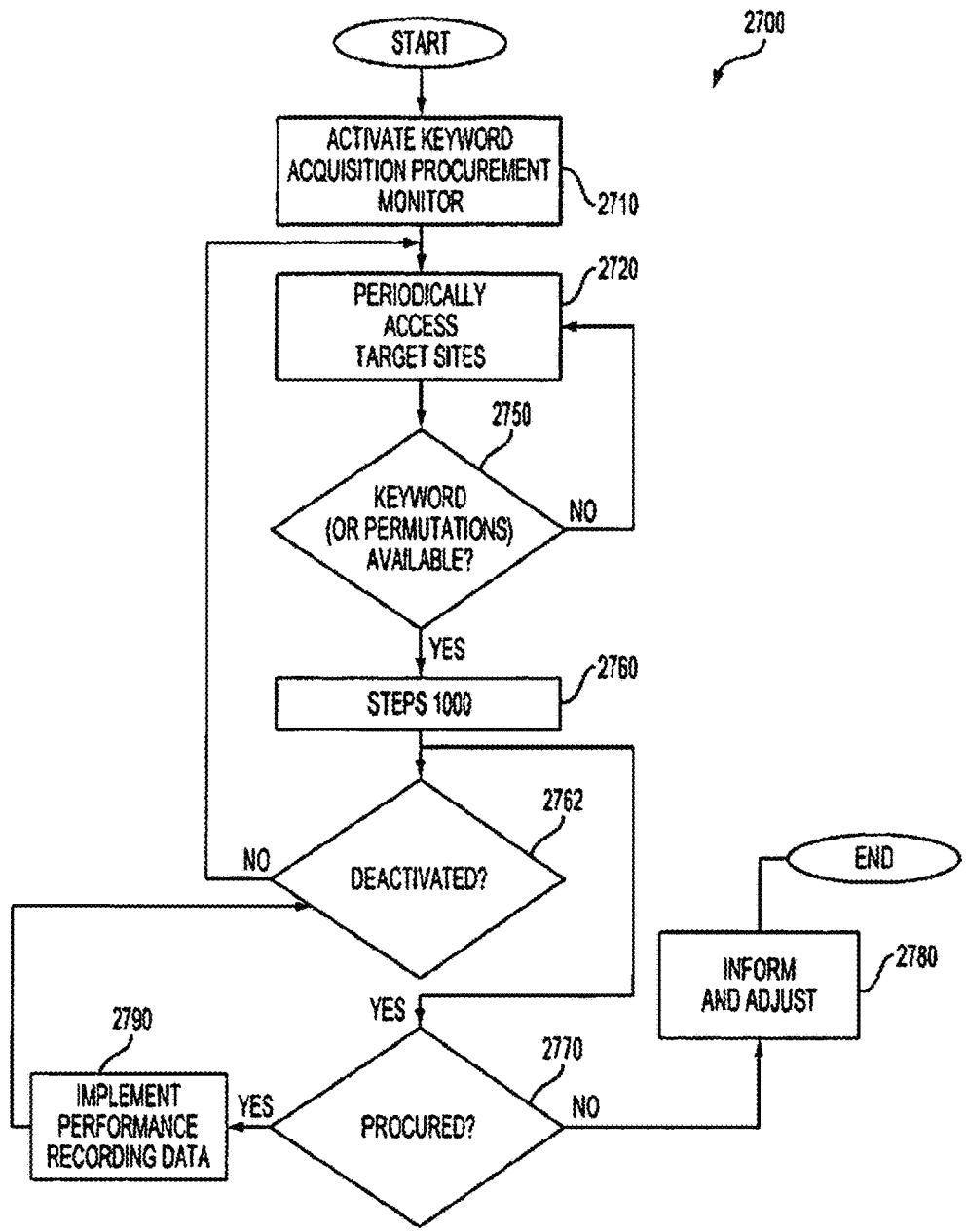
FIG. 21 illustrates a method for automating the customer procurement device bidding and acquisition system.

Referring now to FIG. 21 an automated method for the customer procurement device acquisition system 2700 is shown. The automated customer procurement device has a scheduling and notification module 300 as a virtual part of e-commerce interface 100. The scheduling and notification module 300 may be physically located on the computing device. The scheduling and notification module 300 can self-activate in step 2710 or monitor keyword selling sites discretely or continuously in step 2720. If the module finds that a target keyword is available in step 2750, then the method shown and described in FIG. 10 above is performed in step 2760. If the system is not deactivated in step 2762 it returns to the monitoring state. Simultaneously, if the system was not successful in step 2770, it performs a notification and adjustment in step 2780. If it was successful it records any performance detection programs in step 2790 before being reactivated.

Figure 22:
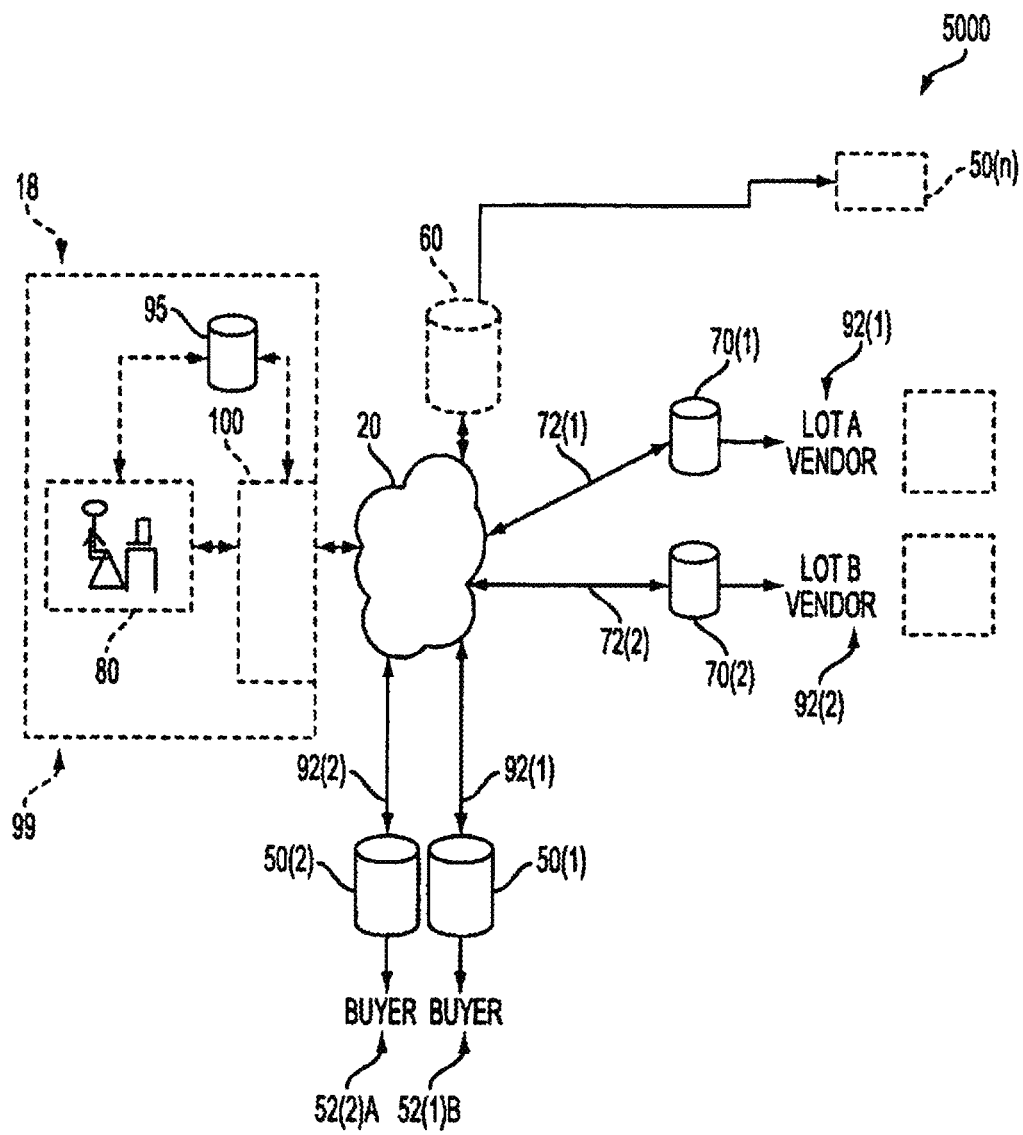
FIG. 22 is a sample embodiment of the up-selling or cross-selling embodiment of the present invention.
Figure 23:
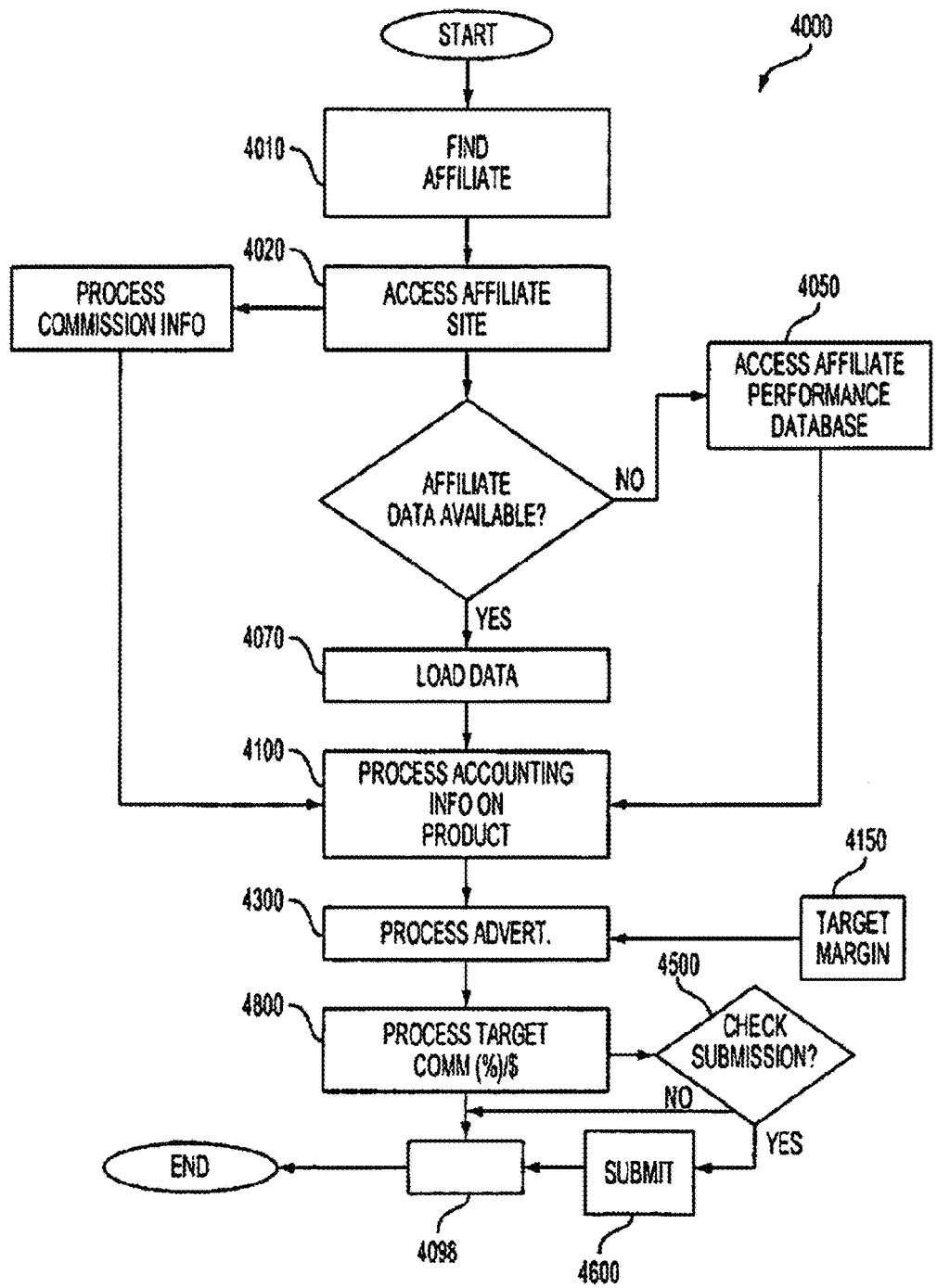
FIG. 23 is an embodiment of the invention which allows for affiliate-tracking to determine effective advertising channel placement.

Referring now to FIG. 22, a cross-selling, up-selling and/or agency system 5000 using the present invention is shown and includes one or more vendor systems 70(n) and one or more buyer systems 40(n). The e-commerce interface 100 advises the user 90 who is now brokering both between one or more vendors 70(n) and purchasers 40(n) as well as procuring Internet advertising devices on search engines 50 at the same time. As can be appreciated, the complexity of such dynamic transactions almost requires the dynamic pricing e-commerce interface 100 to maximize potential profits and assist with the pricing.

Figure 24:
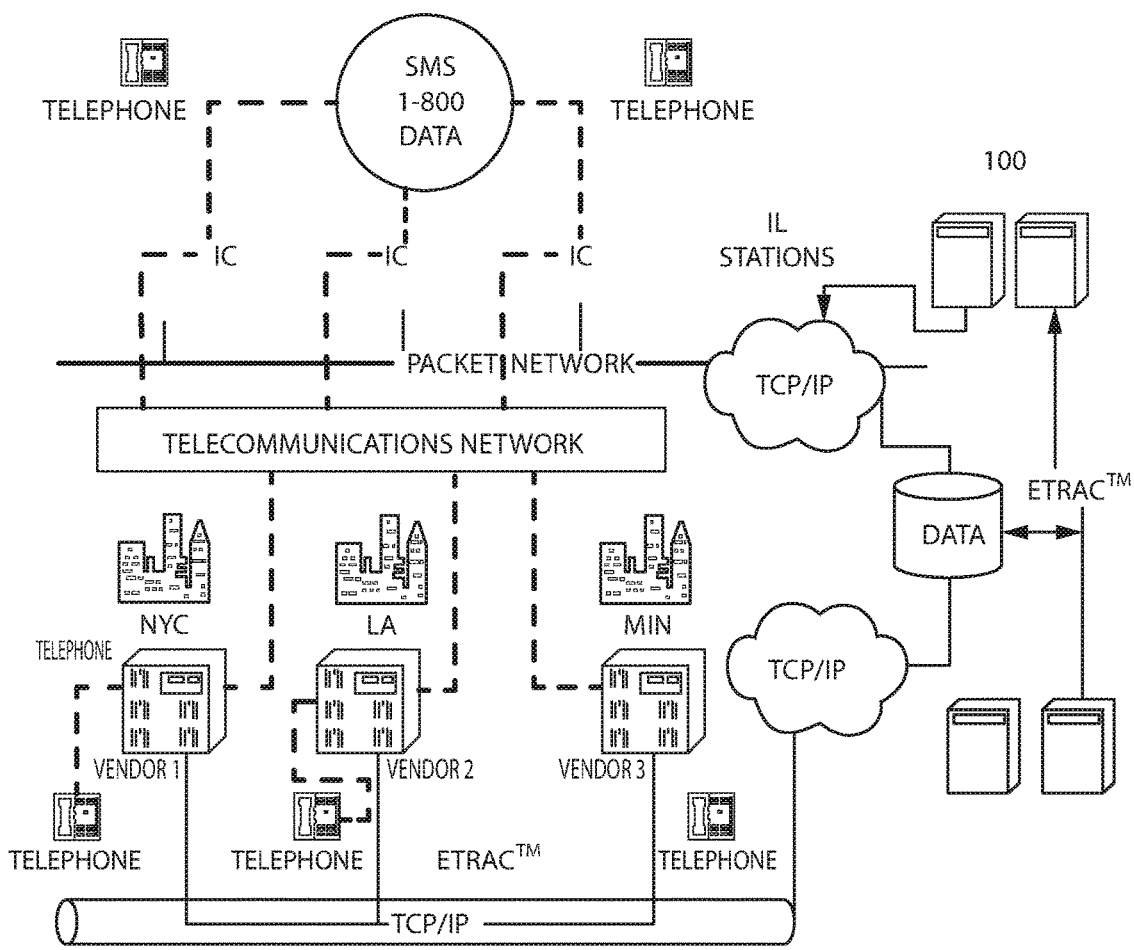
FIG. 24 is a diagram in a telephonic sales channel tracking embodiment of the present invention.

FIG. 24 illustrates an alternate embodiment of the invention in which the e-commerce channel advertising procurement and analysis system can support other sales channels, such as 1-800 telephone numbers. This particular embodiment may be more effective in assisting entities with items that are traditionally sold by toll-free sales as opposed to pure internet sales. It also provides for cooperative opportunities in which delivery systems may be more effective spread out among smaller regional sales coverage, such as flower delivery.

FIG. 24 shows some optional features of the alternate sales channel advertising channel system as well. An advertisement or a product or service available through a 1-800 sales channel, includes an identification code, whether in alpha-numeric or code word (not shown). The advertisement, in a preferred embodiment, is most likely viewed over the Internet, but the embodiments of the invention are not limited to the Internet advertising and the identification code could easily be transmitted by television, radio, press, billboard, sandwich board or other traditional media. The 1800 call is placed through a telephone or cellphone and most likely routed through an SMS database for 1800 number routing. In alternate embodiments the call may be routed though other types of programmable telephonic routing. In the diagram, the call is routed through the SMS database rules to optional intermediate relays or routers IL STATIONS that may be part of the public telephonic network, but also may be privately operated. The call is routed via the programmed rules, which will be discussed in below in FIGS. 25-27, through a telecommunications network, or alternately through a packetized network (such as Voice over IP) to the appropriately chosen vendors (vendor 1, NYC), (vendor 2, LA), or (vendor 3, Minneapolis), where the call is processed by the vendor.

The telephonic vendor (vendors 1, 2, and 3) who processes the call may allow for the ID to be placed into the phone prior to processing the call, thus the ID can be tracked via various method including routed with the call. The process of identification code entry for telephonic interfaces for internal tracking purposes is disclosed by a family of patents issued to Ronald A. Katz, Licensing Partners and include U.S. Pat. Nos. 6,148,065, 5,815,551, 5,561,707, 5,684,863, entitled TELEPHONIC-INTEFERFACE STATISTICAL ANALYSIS SYSTEM and U.S. Pat. Nos. 5,787,156, 6,044,135, 6,424,073, 5,365,575 entitled TELEPHONIC-INTERFACE LOTTERY SYSTEM and U.S. Pat. Nos. 5,553,120, 5,349,633, 5,218,631, 6,151,387, entitled TELEPHONIC-INTERFACE GAME CONTROL SYSTEM. Katz also discloses other types of tracking for sales purposes in U.S. Pat. No. 6,055,513 entitled METHODS and APPARATUS FOR INTELLIGENT SELECTION OF GOODS and SERVICES in TELEPHONIC and ELECTRONIC COMMERCE. All of these patent disclosures are incorporated herein by reference. However, these are a few disclosures of the techniques available to process an ID number through a 1800 call and may not be implemented at all in any form in some embodiments of the present invention.

Alternately, the ID may be entered at the intermediate relays IL STATIONS and appropriate tracked through the process of the call.

The ID data is entered into the vendors computer system or a networked system which may be a specialized computer entry system for purposed of tracking information (shown in FIG. 28) labeled as ETRAC(™)

In one embodiment, the invention includes a method for routing a customer call to a particular vendor comprises the steps of providing a phone number to a customer, wherein the number is linked with a plurality of "consumer category codes," and wherein said customer makes said customer call by dialing the phone and entering one of the plurality of "consumer category codes;" determining which of said plurality of consumer category codes is entered by said customer; associating said customer call with a consumer category based on which of the plurality of consumer category codes is entered; creating a consumer category database, wherein the consumer category database contains at least one vendor related with said consumer category; selecting one of said at least one vendor to produce the particular vendor of choice, wherein said particular vendor is selected based on a bidding factor, and wherein the bidding factor comprises a bid made to a provider of said phone number; and displaying a source to the particular vendor, wherein the source provides at least some detail on how said phone number is provided to the customer.

Optional features include where the bidding factor further comprises a preferred vendor status (based on a winning or weighted bid), wherein the bidding factor further comprises a geographical limiter; where the bidding factor further comprises availability of vendor in said category database; where the bidding factor further comprises a financial range provided by the customer; where the bidding factor further comprises a keyword distinction selected by said particular vendor Optional features regarding the consumer category include where the consumer category contains a geographical limitation parameter; where the consumer category codes provide a geographical limitation to the geographical limitation parameter; where the customer provides a geographical limitation to the geographical limitation parameter or a situation where the customer enters a plurality of the consumer category codes.

In one variation, the phone number and at least one of the plurality of consumer category codes is provided to said customer via an advertisement. In another the source details said advertisement where the details comprise past consumer call made because of said advertisement. The advertisement or customer call is via the Internet, and the customer call is dialed automatically and at least one of said plurality of consumer category codes is entered automatically by said customer choosing said advertisement.

FIG. 25 shows the architecture of the procurement system. A group of competitive purchasers PURC POOL, most likely over the internet or other private or semi-private network N (which may be subscription, or a particular ISP), bid for 1800 call listings or routings based on keywords for search engines. Thus, the procurement or purchasing information data PF or PF' is passed from the advertising channel procurement system 100" to the appropriate level of the telephonic or wide area network, IC or 1800 SMS data.

FIG. 26 shows the representative data flow in the toll-free sales advertising channel analysis and procurement system. The identification ID-T is broadcast shown as a television or the internet (but not limited to these media). The ID-T is then passed manually or telephonically (as discussed above) to the 1800 control routing which may include the SMS database or be controlled by a private telephonic network. The 1800 control routing places the call whether directly or through instructions to one of a set of vendors (there may not always be multiple vendors) based on the instructions provided by the procurement system (ref 100" in FIG. 25). The ID tracking is then put into the analysis system 100" by automatic or manual means and in some cases a combination (see FIG. 28). In the case where a purchaser may dial a sales number, such as a 1800 number directly from their computer, the ID-T may be automatically routed through the telephonic system (if it has such capabilities).

Figure 27:
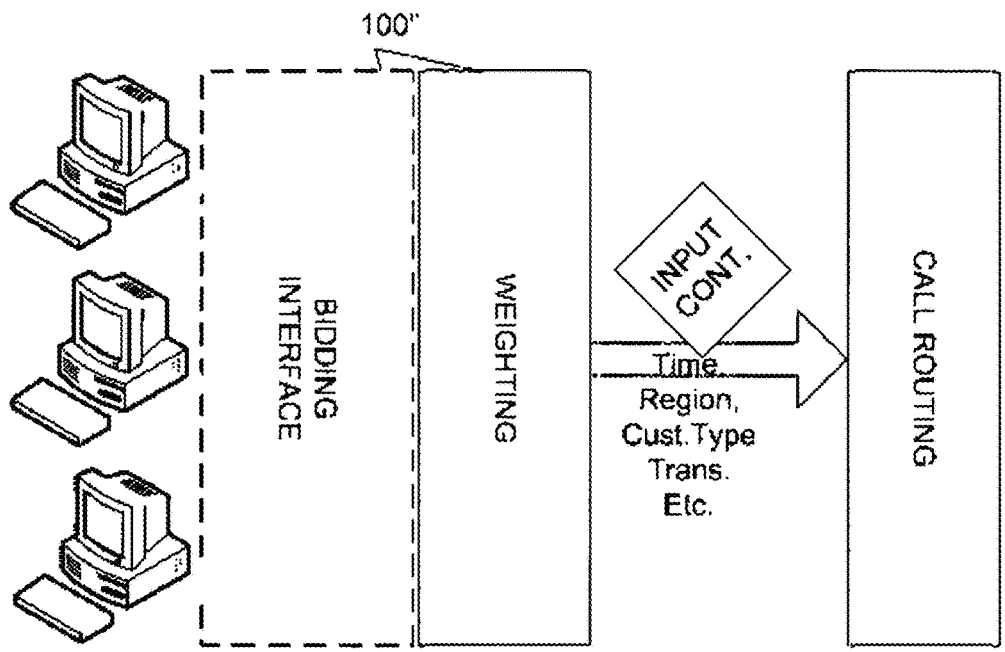
FIG. 27 is a representation of the functional aspects of the toll-free advertising channel acquisition and routing system.

FIG. 27 shows the representative functions of the toll-free sales advertising channel procurement system. The advertising channel analysis and procurement system 100" may be implemented as discussed above in FIGS. 3-23, but the features in the alternate embodiment include the "weighting" module which affects the procurement of the call procurement The procurement system may include such mechanisms as randomization in with or without weighted or contingent factors, such as region, customer type, time, portal used, web surfing behavior (shown in the diamond), or other types of contingent factors that may be used to determine a winning bid for routing the 1800 call to the preferred vendor. In order to facilitate smooth implementation of this embodiment of the invention, it is contemplated that the 1800 routing device (shown in FIG. 25) will provide instructions to the telephonic routing database, such as "1800BUYDIAM" will route the call to jewelry B if the call originated in zone 2. The procurement system may behave in much the same way that the e-commerce advertising channel would behave, except that the end procurement may include the telephonic component in addition to items such as keywords and affiliate tracking.

Figure 28:
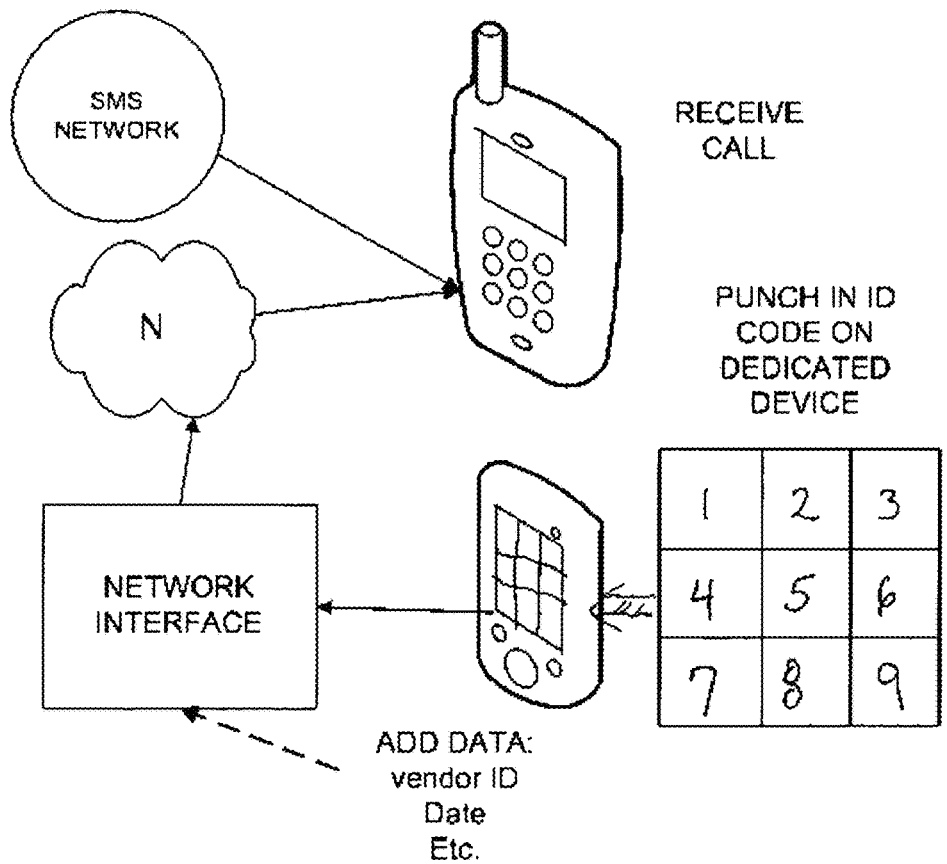
FIG. 28 is an illustration of a sample ID entry system that may be implemented at the 1800 vendor level.

FIG. 28 shows a sample stand-alone computer solution for the ID entry at the 1800 or telephonic vendor level. In this case a simplified device may be used manually to enter the ID codes which are linked through the network (on site or off), or the telephone system passes the code at the vendor level.

As can be also appreciated by those skilled in the art, while the present invention is contemplated in a preferred embodiment to assist those seeking to acquire keywords for impressions or click-throughs, there are other advertising devices that would be appropriately acquired in similar environments by the present invention. The present invention is also dynamic and scalable, as can be appreciated by those skilled in the art, and can be used by individuals as well as large Internet sales organizations.

The invention claimed is:

1. A method for tracking an effectiveness of an advertisement and for routing a telephone call placed in response to the advertisement, the method including:

placing an advertisement for a product or service on an internet, the advertisement including a telephonic number for contacting a vendor in order to obtain the product or service and the advertisement including an alpha-numeric identification code for indicating an effectiveness of the advertisement;

enabling a potential customer to place a telephone call by entering the telephonic number from the advertisement into a keypad of a telephone communicating with the telecommunications network;

enabling the potential customer to enter the identification code from the advertisement into the telecommunications network by manually entering the identification code from the advertisement into the keypad of the telephone communicating with the telecommunications network;

having a routing device select a particular one of a plurality of vendors based on the telephonic number entered by the customer and based on bids made for routing the telephone call, and having the routing device route the telephone call through the telecommunications network to the particular one of the plurality of vendors; and obtaining the identification code from the telecommunications network and, in order to track the identification code, putting the identification code in an analysis system.

2. The method according to claim 1, which comprises:

associating the identification code with a plurality of vendors;

using the identification code, which is in the advertisement, to specify a geographic limitation; and having the routing device select the particular one of the plurality of vendors and route the telephone call to the particular one of the plurality of vendors based at least in part on the geographic limitation specified by the identification code.

3. The method according to claim 1, wherein the routing device selects the particular one of the plurality of vendors and routes the telephone call to the particular one of the plurality of vendors at least partly based at least in part on a geographic limitation that is specified by the identification code.

4. The method according to claim 1, wherein the routing device selects the particular one of the plurality of vendors and routes the telephone call to the particular one of the plurality of vendors based at least in part on a financial range provided by the potential customer.

5. The method according to claim 1, wherein the identification code is a consumer category code associated with the plurality of vendors.

6. The method according to claim 1, wherein the routing device selects the particular one of the plurality of vendors and routes the telephone call to the particular one of the plurality of vendors based at least in part on the identification code that is included in the advertisement.

* * * * *